(12) United States Patent
Bober et al.

(10) Patent No.: US 7,945,669 B2
(45) Date of Patent: May 17, 2011

(54) METHOD AND APPARATUS FOR PROVISIONING STORAGE RESOURCES

(75) Inventors: Paul M. Bober, Lexington, MA (US); Jason D. Lindholm, Cambridge, MA (US); Jeffrey L. Alexander, Watertown, MA (US); Sheldon Lowenthal, Lexington, MA (US)

(73) Assignee: EMC Corporation, Hopkinton, MA (US)

( * ) Notice: Subject to any disclaimer, the term of this patent is extended or adjusted under 35 U.S.C. 154(b) by 2402 days.

(21) Appl. No.: 10/283,908

(22) Filed: Oct. 30, 2002

(65) Prior Publication Data

US 2004/0088417 A1 May 6, 2004

(51) Int. Cl.
G06F 15/173 (2006.01)
G06F 15/16 (2006.01)

(52) U.S. Cl. .................. 709/226; 709/217; 709/229

(58) Field of Classification Search .......... 709/217–219, 709/225, 227–229, 226
See application file for complete search history.

(56) References Cited

U.S. PATENT DOCUMENTS

| | | | |
|---|---|---|---|
| 5,544,347 A | 8/1996 | Yanai et al. | |
| 5,745,669 A | 4/1998 | Hugard et al. | |
| 5,822,531 A | 10/1998 | Gorczyca et al. | |
| 5,870,545 A | 2/1999 | Davis et al. | |
| 6,003,075 A | 12/1999 | Arendt et al. | |
| 6,161,218 A | 12/2000 | Taylor | |
| 6,163,776 A | 12/2000 | Periwal | |
| 6,182,136 B1 | 1/2001 | Ramanathan et al. | |
| 6,272,390 B1 | 8/2001 | Skovgaard | |
| 6,367,075 B1 | 4/2002 | Kruger et al. | |
| 6,415,372 B1 | 7/2002 | Zakai et al. | |
| 6,484,245 B1 | 11/2002 | Sanada et al. | |
| 6,529,996 B1 * | 3/2003 | Nguyen et al. | 711/114 |
| 6,542,909 B1 | 4/2003 | Tamer et al. | |
| 6,735,707 B1 * | 5/2004 | Kapil | 713/322 |
| 6,832,289 B2 | 12/2004 | Johnson | |
| 6,956,839 B2 * | 10/2005 | Sexton et al. | 370/335 |
| 7,035,279 B2 * | 4/2006 | Bruckman | 370/460 |
| 7,085,763 B2 | 8/2006 | Ochiai et al. | |

(Continued)

FOREIGN PATENT DOCUMENTS

EP 0 505 691 A1 9/1992

(Continued)

OTHER PUBLICATIONS

PCT International Search Report.

(Continued)

*Primary Examiner* — Joseph E Avellino
*Assistant Examiner* — Thomas Duong
(74) *Attorney, Agent, or Firm* — Muirhead and Saturnelli, LLC

(57) ABSTRACT

A method and apparatus for automatically provisioning at least a portion of a computer system to meet a specification provided in a provisioning request. In one embodiment, the provisioning includes provisioning at least one resource from each of at least one host computer, at least one storage system, and at least one connectivity resource that connects the at least one host computer to the at least one storage system. In another embodiment, the provisioning includes selecting and configuring at least one logical volume of storage and configuring the computer system to provide access to the selected volume. In another aspect, a computer-readable provisioning transaction is created to provision the computer system, and a computer-readable undo transaction is created to undo it. In a further embodiment, an existing computer system is reverse engineered to create a specification that is modified to create the specification in the provisioning request.

86 Claims, 6 Drawing Sheets

U.S. PATENT DOCUMENTS

| | | | | |
|---|---|---|---|---|
| 7,103,665 B2 * | 9/2006 | Shinohara et al. | ............ | 709/226 |
| 7,133,907 B2 * | 11/2006 | Carlson et al. | ................ | 709/220 |
| 7,286,555 B2 * | 10/2007 | Demerville et al. | ........... | 370/442 |
| 7,330,832 B1 * | 2/2008 | Gray et al. | ....................... | 705/37 |
| 7,409,446 B2 * | 8/2008 | Washio et al. | ................ | 709/225 |
| 7,444,398 B1 * | 10/2008 | Matthews | ..................... | 709/224 |
| 7,448,079 B2 * | 11/2008 | Tremain | .......................... | 726/14 |
| 7,586,859 B2 * | 9/2009 | Petrovykh | ..................... | 370/270 |
| 2002/0052941 A1 | 5/2002 | Patterson | | |
| 2002/0069369 A1 * | 6/2002 | Tremain | ........................ | 713/201 |
| 2002/0116496 A1 | 8/2002 | Lew et al. | | |
| 2002/0156892 A1 * | 10/2002 | Karger et al. | ................. | 709/225 |
| 2002/0159433 A1 * | 10/2002 | Sexton et al. | ................. | 370/349 |
| 2004/0010591 A1 * | 1/2004 | Sinn et al. | ..................... | 709/225 |
| 2004/0073673 A1 * | 4/2004 | Santos et al. | ................. | 709/226 |

FOREIGN PATENT DOCUMENTS

| | | |
|---|---|---|
| EP | 1 271 296 A2 | 1/2003 |
| GB | 2 384 070 A | 7/2003 |
| JP | 06-161685 | 6/1994 |
| JP | 07-302267 | 11/1995 |
| JP | 10-333839 | 12/1998 |
| JP | 2001-092769 | 4/2001 |
| WO | WO 01/14987 | 3/2001 |
| WO | WO 01/98889 A2 | 12/2001 |
| WO | WO 02/03203 A2 | 1/2002 |

OTHER PUBLICATIONS

Blunden M. et al. "Storage Networking Virtualization What's it all about?" Dec. 2000, IBM Redbooks.

Khattar R., "Introduction to Storage Area Network, SAN", Aug. 1999, IBM.

International Search Report, dated May 24, 2005.

PCT Written Opinion of corresponding International Application No. US 03/23998.

Examination Report from British Application Serial No. GB0600140.8 dated Jul. 24, 2006.

Examination Report from British Application Serial No. GB0600143.2 dated Jul. 27, 2006.

Office Action from German Application Serial No. 103 93 595.9 dated Jul. 12, 2006.

Sugarman et al., "Virtualizing I/O Devices on VMware Workstation's Hosted Virtual Machine Monitor," *Proceedings of the 2001 USENIX Annual Technical Conference*, Boston, Massachusetts, Jun. 25-30, 2001.

Decision of Refusal for Japanese Patent Application No. 2004-549924, dated Mar. 25, 2008.

Notification of Reasons for Rejection for Japanese Patent Application No. 2004-549924, dated Nov. 20, 2007.

International Preliminary Examination Report for PCT/US03/23998, dated Jul. 20, 2006.

\* cited by examiner

METHOD AND APPARATUS FOR PROVISIONING STORAGE RESOURCES

FIELD OF THE INVENTION

The present invention relates to computer systems, and more particularly to provisioning resources in a computer system.

DESCRIPTION OF THE RELATED ART

Many computer systems include one or more host computers, one or more storage systems that store data used by the host computers, and one or more networking components which enable communication between the host computers and the storage systems. An example of such a system is shown in FIG. 1.

The system 10 of FIG. 1 includes a pair of host computers 1, 2, a pair of storage systems 6,7, and a plurality of switches 3-5 that connect the hosts to the storage systems. As depicted in FIG. 1, host computers 1, 2 each includes one or more file systems 16, 26, which are logically related sets of data, created and maintained by the hosts' operating systems, and stored among logical volumes of storage presented by the storage systems 6, 7 (as represented by dotted lines in FIG. 1). The logical volumes may each correspond to a physical storage device (such as a disk drive) within one of the storage systems, or if storage systems 6, 7 are intelligent storage systems, a mapping layer may be provided by the storage systems between the logical volumes presented to the host computers and the physical storage devices. Thus, there need not be a one-to-one correspondence between the logical volumes presented to the host computers and the physical storage devices, as a single logical volume can be spread across multiple physical storage devices, or alternatively, a number of physical storage devices can be combined to store the data for a single logical volume.

In some computer systems, storage systems may be directly attached to the host computers, such that each port on the storage system may be dedicated to a port on a particular host computer. However, in the illustrative computer system of FIG. 1, a storage area network (SAN) is employed, so that access to the storage systems 6, 7 may be shared among multiple host computers. Thus, networking components are connected between the host computers 1, 2 and the storage systems 6, 7. As depicted in FIG. 1, the networking components may include one or more switches 3-5 that may be interconnected between the host computers 1, 2 and the storage systems 6, 7 to provide the desired configuration. In this respect, it should be appreciated that each of the host computers 1, 2, the storage systems 6, 7 and the switches 3-5 has one or more ports that are capable of being coupled, via a communication medium, to the port of another device to enable communication through that port. For example, in the illustrative computer system of FIG. 1, the host computer 1 includes a plurality of ports 15, each interconnected via a communication line 17 to one of a plurality of ports 33 on switch 3. Similarly, host computer 2 includes a plurality of ports 25 that are each interconnected, via a communication line 27, to one of a plurality of ports 43 on switch 4. The switch 3 further includes a port 35 that is coupled via communication line 37 to one of a plurality of ports 53 on switch 5. Similarly, switch 4 includes a port 45 that is coupled via a communication line 47 to another one of the plurality of ports 53 on switch 5. Finally, switch 5 includes a plurality of ports 55 that are interconnected, via a plurality of communication lines 57, to the storage systems 6, 7. In particular, storage system 6 includes a plurality of ports 65 that are coupled to a subset of the ports 55 of switch 5 via some of the communication lines 57, and storage system 7 includes a plurality of ports 75 that are connected to different ones of the ports 55 on the switch 5 via the other communication lines 57.

It should be appreciated that the above-discussed configuration provides a physical communication path from any of the ports on the host computers 1, 2, through the switches 35, to any of the ports on the storage systems 6, 7. Each of the storage systems 6, 7 can be configured so that one or more logical volumes (66 for the storage system 6 and 77 for the storage system 7) may be made available outside of the storage system on one or more of the storage system ports 65, 75. In the illustrative configuration of FIG. 1, two of the logical volumes 66 in the storage system 6 are exported through each of the ports 65, and two of the logical volumes 77 in the storage system 7 are exported through each of the ports 75.

Although the physical connections illustrated in the system of FIG. 1 may make it physically possible for each of the host computers 1, 2 to access each of the logical volumes 66, 77 over any of the host computer ports 15, 25, it should be appreciated that in most typical computer system configurations the access afforded a host computer will be more limited. For example, in many computer systems, any particular one of the logical volumes 66, 77 will not be shared by the host computers 1, 2, but will be dedicated to only one of the host computers. In particular, in some computer system configurations, security measures (e.g., zoning and/or masking) are performed to define limited access to one or more of the logical volumes 66, 77.

Another example of a computer system is shown in FIG. 4 and includes a host computer 401 and a storage system 403 that includes a plurality of storage devices on which data is stored. The host computer 401 and storage system 403 show illustrative configurations for the host computers 1, 2 and storage systems 6, 7 in the system 10 of FIG. 1, although numerous other configurations are possible.

In the exemplary system shown in FIG. 4, the storage system 403 includes a plurality of disk drives 405a-405b and a plurality of disk controllers 407a-407b that respectively control access to the disk drives 405a-405b. The storage system 403 further includes a plurality of storage bus directors 409 that control communication with the host computer 401 over communication buses 417. The storage system 403 also includes a cache 411 to provide improved storage system performance; in particular, when the host computer 401 executes a read from the storage system 403, the storage system 403 may service the read from the cache 411 (when the data is stored in the cache) rather than from one of the disk drives 405a-405b, to execute the read more efficiently. Similarly, when the host computer 401 executes a write to the storage system 403, the corresponding storage bus director 409 can execute the write to the cache 411. Thereafter the write can be performed asynchronously, in a manner transparent to the host computer 401, to the appropriate one of the disk drives 405a-405b. Finally, the storage system 403 includes an internal bus 413 over which the storage bus directors 409, disk controllers 407a-407b, and cache 411 communicate.

The host computer 401 includes a processor 416, and one or more host bus adapters 415 that each controls communication between the processor 416 and the storage system 403 via a corresponding one of the communication buses 417. It should be appreciated that rather than a single processor 416, the host computer 401 can include multiple processors. Each bus 417 can be any of a number of different types of communication links, with the host bus adapter 415 and the storage bus directors 409 being adapted to communicate using an appropriate protocol for the communication bus 417 coupled therebetween. For example, each of the communication buses 417 can be implemented as a SCSI bus with the directors 409 and adapters 415 each being a SCSI driver. Alternatively, communication between the host computer 401 and the storage system 403 can performed over a Fibre Channel fabric.

As shown in the exemplary system of FIG. 4, some computer systems employ multiple paths for communication between the host computer 401 and the storage system 403 (e.g. each path includes a host bus adapter 415, a bus 417, and a storage bus director 409 in FIG. 4). In many such systems, each of the host bus adapters 415 has the ability to access each of the disk drives 405a-405b through the appropriate storage bus director 409 and disk controller 407a-407b. It should be appreciated that providing such multi-path capabilities enhances system performance, and that multiple communication operations between the host computer 401 and the storage system 403 can be performed simultaneously.

FIG. 5 is a schematic representation of a number of mapping layers that may exist in a multi-path computer system such as the one shown in FIG. 4. The system includes an application layer 521 which includes application programs executing on the processor 416 of the host computer 401. The application layer 521 will generally refer to storage locations used thereby with a label or identifier such as a file name, and will have no knowledge about where the file is physically stored on the storage system 403. Below the application layer 521 is a file system and/or a logical volume manager (LVM) 523 that maps the label or identifier specified by the application layer 521 to a logical volume that the host computer perceives to correspond directly to a physical device address (e.g. the address of one of the disk drives 405a-405b) within the storage system 403. Below the file system/LVM layer 523 is a multi-path mapping layer 525 that maps the logical volume address specified by the file system/LVM layer 523 through a particular one of the multiple system paths to the logical volume address to be presented to the storage system 403. Thus, the multi-path mapping layer 525 not only specifies a particular logical volume address, but also a particular one of the multiple system paths to access the specified logical volume. Examples of software used to implement multi-path mapping layers include the PowerPath driver available from EMC Corporation, Veritas DMP, and Compaq SecurePath.

If the storage system 403 were not an intelligent storage system, the logical volume address specified by the multi-pathing layer 525 would identify a particular physical device (e.g. one of the disk drives 405a-405b) within the storage system 403. However, for an intelligent storage system such as that shown in FIG. 4, the storage system itself may include a further mapping layer 527 such that the logical volume address passed from the host computer 401 may not correspond directly to an actual physical device (e.g. a disk drive 405a-405b) on the storage system 403. Rather, a logical volume specified by the host computer 401 can be spread across multiple physical storage devices (e.g. disk drives 405a-405b), or multiple logical volumes accessed by the host computer 401 can stored on the single physical storage device.

It should be appreciated that the particular system configurations shown in FIGS. 1, 4, and 5 are provided merely for illustrative purposes, and that typical configurations can vary in many ways, and can often be significantly more complex in terms of the numbers of host computers, storage systems and/or networking components that interconnect them. Furthermore, while each of the multiple instances of host computers, switches and storage systems in FIG. 1 is illustrated as having essentially the same configuration (e.g., the same number of ports, the same number of logical volumes, etc.), it should be appreciated that in typical configurations, the various system components may have different configurations.

It should be appreciated that resource selection and configuration to form a computer system such as that in FIG. 1 can be a complex and labor-intensive exercise, as there are a myriad of operations to be performed. For example, to create the configuration of FIG. 1 which employs the mapping layers depicted in FIG. 5, determinations are made concerning the numbers and sizes of logical volumes 66, 77 to be made available to particular resources in the host computers 1, 2 (e.g., file systems 16, 26), and through which of the ports of the storage systems, switches and host computers the logical volumes will be made available. In addition, security measures are implemented to define host access to logical volumes, and scanning steps are performed by the host computers 1, 2 for each port 15, 25 to enable the host computers to recognize the logical volumes that have been made available to them. The configuration process can be further complicated by the fact that system components can possess heterogeneous physical characteristics. For example, communication links 17, 27, 37, 47, 57 may each be implemented as a SCSI bus, Fibre Channel connection or other type of connection, switches 3-5 can be selected from a collection of heterogeneous switch types, and host computers and/or storage systems may be supplied by different vendors. Each of these components may have particular configuration requirements.

In view of the complex, labor-intensive and time-consuming nature of the configuration process for a computer system, one embodiment of the present invention is directed to techniques for automating and/or facilitating the provisioning of such a computer system.

SUMMARY OF THE INVENTION

One embodiment of the invention is directed to a method of provisioning at least a portion of a computer system to meet a specification provided in a provisioning request. The method comprises computer-implemented acts of: (A) reading the provisioning request; and (B) automatically provisioning the at least a portion of the computer system to meet the specification provided in the provisioning request, including automatically provisioning at least one resource on at least one host computer, at least one resource from at least one storage system, and at least one component of at least one connectivity resource that connects the at least one host computer to the at least one storage system. Another embodiment is directed to a computer readable medium encoded with a computer program that, when executed, performs the method.

Another embodiment is directed to an apparatus comprising at least one processor programmed to automatically provision at least a portion of a computer system to meet a specification provided in a provisioning request, including automatically provisioning at least one resource on at least one host computer, at least one resource from at least one storage system, and at least one component of at least one connectivity resource that connects the at least one host computer to the at least one storage system.

A further embodiment is directed to a method of provisioning at least a portion of a computer system to meet a specification provided in a provisioning request. The method comprises computer-implemented acts of: (A) reading the provisioning request, the provisioning request defining the at least a portion of the computer system to comprise a unit of storage to be provided to at least one of a plurality of host computers; and (B) automatically provisioning the at least a portion of the computer system in response to the provisioning request. The act (B) includes acts of: (B1) selecting at least one logical volume of storage from at least one storage system that can serve as the unit of storage defined by the provisioning request; (B2) selecting at least one connectivity resource that can provide a communication path through which the selected at least one logical volume can be made accessible to the at least one of the plurality of host computers; (B3) creating a transaction that comprises a series of actions to configure the selected at least one logical volume and the selected at least one connectivity resource to satisfy the provisioning request, including configuring the selected at least one logical volume to satisfy the provisioning request, mapping the selected at least one logical volume to at least one port of the at least one storage system through which the selected at least one logical volume will be accessible, configuring the communication path, and configuring security measures on at least a portion of the computer system to provide access to the selected at least one logical volume only to the at least one of the plurality of host computers; and (B4) executing the transaction to configure the selected at least one logical volume and the selected at least one connectivity resource in a manner that satisfies the provisioning request. Another embodiment is directed to a computer readable medium encoded with a computer program that, when executed, performs the method.

Another embodiment is directed to an apparatus, comprising at least one processor programmed to automatically provision at least a portion of a computer system to meet a specification provided in a provisioning request that defines the at least a portion of the computer system to comprise a unit of storage to be provided to at least one of a plurality of host computers. The at least one processor is programmed to select at least one logical volume of storage from at least one storage system that can serve as the unit of storage defined by the provisioning request; select at least one connectivity resource that can provide a communication path through which the selected at least one logical volume can be made accessible to the at least one of the plurality of host computers; create a transaction that comprises a series of actions to configure the selected at least one logical volume and the selected at least one connectivity resource to satisfy the provisioning request, including configuring the selected at least one logical volume to satisfy the provisioning request, mapping the selected at least one logical volume to at least one port of the at least one storage system through which the selected at least one logical volume will be accessible, configuring the communication path, and configuring security measures on the at least a portion of the computer system to provide access to the selected at least one logical volume only to the at least one of the plurality of host computers; and execute the transaction to configure the selected at least one logical volume and the selected at least one connectivity resource in a manner that satisfies the provisioning request.

A further embodiment is directed to a method of provisioning at least a portion of a computer system to a desired configuration. The method comprises acts of: (A) creating a computer-readable provisioning transaction that comprises a series of provisioning actions to provision a plurality of computer system resources to meet the desired configuration; and (B) creating a computer-readable undo transaction that comprises a series of undo actions to undo at least a subset of the series of provisioning actions. Another embodiment is directed to a computer readable medium encoded with a computer program that, when executed, performs the method.

Another embodiment is directed to a method of provisioning at least a portion of a desired computer system. The method comprises acts of: (A) automatically reverse engineering at least a portion of an existing computer system to create a specification of a configuration of the at least a portion of the existing computer system; (B) modifying the specification of the at least a portion of the existing computer system to create a specification for the at least a portion of the desired computer system; and (C) automatically provisioning the at least a portion of the desired computer system to meet the specification for the desired computer system.

DETAILED DESCRIPTION

Figure 1:
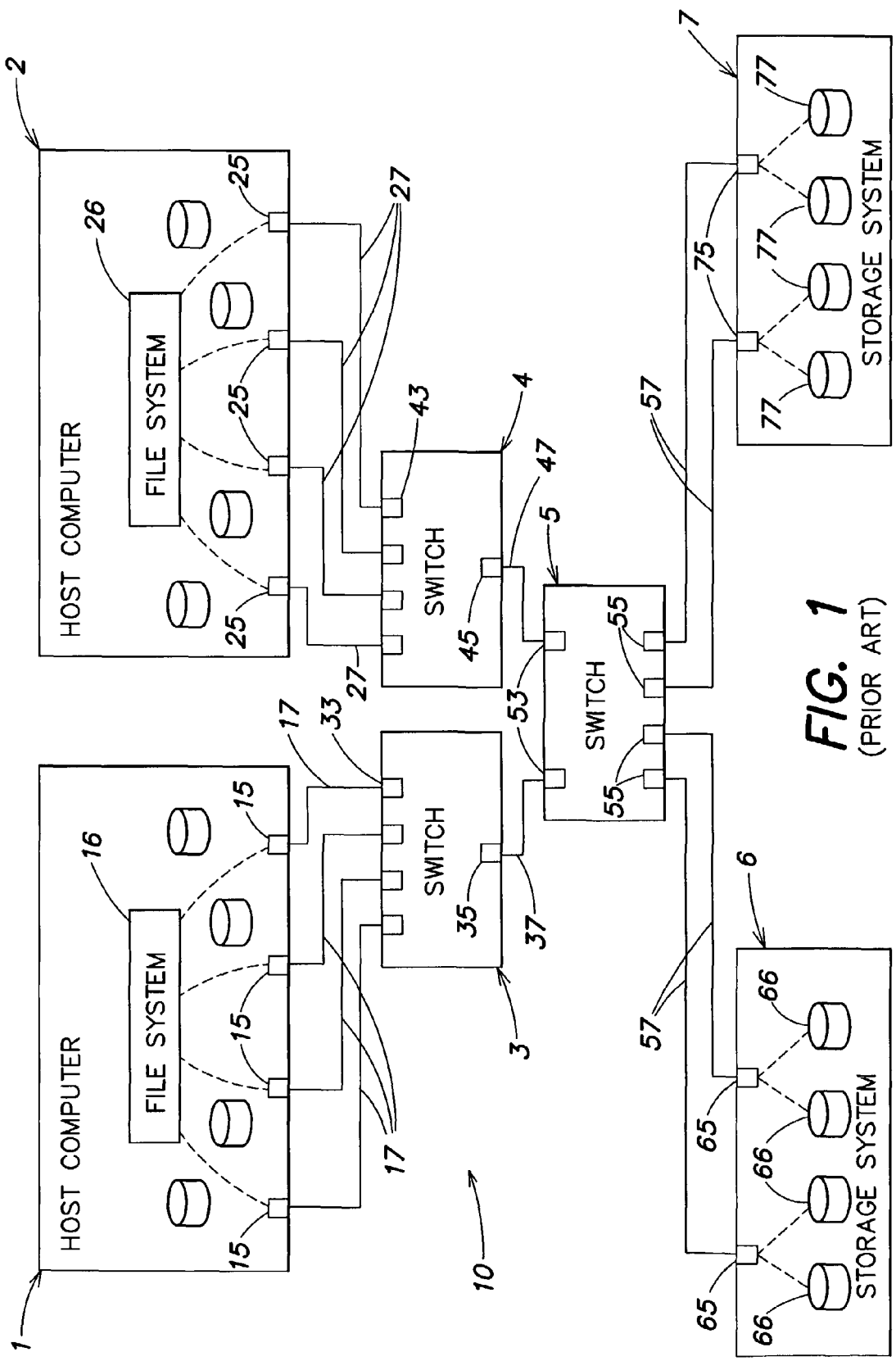
FIG. 1 is a block diagram depicting an exemplary computer system of the type which embodiments of the invention can be used to provision.

One embodiment of the present invention is directed to a method and apparatus for automatically provisioning resources in a computer system. In one embodiment, a user defines a desired system configuration, and the process automatically provisions the desired system configuration, meaning that appropriate resources are selected and/or actions are performed to configure the resources as specified. As used herein, the reference to an action being performed automatically refers to the action not involving manual human intervention to complete, once it has been initiated.

As discussed above, provisioning a computer system can be a complex process involving a number of issues. These issues can be broadly categorized as host-based issues, storage system-based issues, and connectivity or network-based issues.

Examples of host-based issues include determining the amount of storage space (divided among one or more logical volumes) desired for a host, and the assignment of those logical volumes among various resources in the host, such as one more file systems, logical volume managers (LVM) and database managers.

Examples of storage system-based issues include how many storage systems will be employed, how many logical volumes of storage will be made available, the storage capacity they will have, whether the logical volumes are currently mapped to storage ports or need to be mapped in order to be accessed, whether any of the volumes will be mirrored or otherwise replicated, the performance requirements for particular volumes of storage (it should be appreciated that a computer system may include multiple different types of storage systems with different performance characteristics), the types of physical storage devices on which one or more of the logical volumes are to be stored, and whether certain logical volumes will need to handle particularly high levels of input/output (I/O) activity, etc.

Finally, connectivity or network-based issues include determining which host computers will be granted access to which logical volumes of storage, the ports on the computer system through which a logical volume will be made available to a particular host, and configuring security measures, such as zoning operations that limit access by particular hosts to certain logical volumes.

In accordance with one embodiment of the present invention, an automated process is employed to automatically provision a computer system in response to a provisioning request that includes a specification that defines a desired configuration for the computer system. If desired, the provisioning request can specifically identify, at a very detailed level, the exact nature of the system to be configured, including at one extreme identifying which ports of certain devices should be interconnected. However, in accordance with one embodiment of the present invention, the low level detail concerning the provisioning of the computer system is left to the automated process, such that the provisioning request is provided at a significantly higher level, thereby reducing the time and effort required to construct a provisioning request. Thus, in a manner described below, the provisioning request can define aspects of the system at a relatively high level in terms of the nature of the configuration to be defined, and the automated provisioning process will take that high-level definition and automatically provision a computer system that fits the definition. However, if the user chooses to provide a definition that provides requirements at a lower level, the automated provisioning process is able to comply with those requirements as well. However, the automated provisioning process can also take a higher level definition and automatically provision a computer system that meets it.

1. Defining a Provisioning Request

The provisioning request can be provided in any of numerous forms, as the present invention is not limited to any particular implementation. As discussed above, the definition of a computer system to be provisioned can include information broadly categorized into three areas: host-based information, storage system-based information, and connectivity or network-related information. In one embodiment of the present invention, a provisioning request includes three components that relate to these three different areas. The creation of a provisioning request that includes these three components is illustrated conceptually in FIG. 3. Of course, the present invention is not limited to a provisioning request that takes this form, as other implementations are possible.

In accordance with one embodiment of the present invention, the provisioning request is simplified by employing a concept known as a storage element to aggregate units of storage that are logically related from the perspective of a host computer (e.g., a collection of logical volumes that together store a file system, a logical volume manager, or a database). Thus, if a volume of storage within a logically related set has a number of hardware mirrors, those hardware mirrors may be defined as part of the same storage element, because the hardware mirroring operation is performed by the storage systems in a manner transparent to the host. Conversely, if a volume of storage has a software mirror that is maintained by the host itself, that software mirror may be provided in a different storage element. It should be appreciated that the present invention is not limited to an implementation which provides a storage element concept in this manner, as numerous other implementations are possible. Furthermore, although the use of storage elements to aggregate logically related units of storage is advantageous, it should be appreciated that the present invention is not limited to using a provisioning request that employs this concept, as each unit of storage can alternatively be treated individually.

As discussed above, in one embodiment the provisioning request includes components that address storage system-based issues, host-based issues, and connectivity or network-based issues. This is illustrated conceptually in FIG. 3, wherein block 210 represents the creation of a storage device specification addressing storage system-based configuration issues, block 214 represents creation of a host specification addressing host-based configuration issues, and block 212 represents creation of a host logical unit (HLU) specification that deals with the connectivity or network-based issues.

A. Storage Device Specification

The storage device specification created in block 210 defines the configuration of the storage systems. As discussed above, the provisioning request can be at any level of detail that the requestor desires, and the storage device specification component can define any aspects of the storage systems that the requester desires to be configured in a particular manner. Examples of the types of information that can be included in the storage device specification may include the number of storage volumes to be made available, the storage capacity of each, mirroring or replication characteristics (e.g., a local or geographically remote hardware mirror), striping requirements, redundancy or fault tolerance requirements (e.g., one of the RAID levels), any desired performance requirements for particular volumes responding to I/O operations, any specific requirements for the type of physical storage devices on which one or more of the volumes is to be stored, specific vendor and/or models on which one or more volumes are to be stored, and spare volumes to be provided (e.g., a hot spare to provide short term performance improvements, or for use as a snapshot mirror such as a business continuance volume (BCV) available from EMC Corporation). It should be appreciated that the list above is provided merely for illustrative purposes and is not exhaustive, as any characteristic of a storage system can be included in the storage device specification if the requestor desires that the system configuration to be provisioned include that characteristic.

In one embodiment of the present invention, the automated provisioning process can be performed in connection with a management tool deployed on the system that organizes various storage resources into storage pools. Storage pools may be employed to group resources for administrative reasons, to group resources sharing certain characteristics, such as performance characteristics or type of physical storage devices, or for other reasons. When a provisioning request is provided for provisioning a computer system that employs a management tool that groups storage resources (e.g., logical volumes) into storage pools, the provisioning request can (optionally) request that various storage resources be provided from certain storage pools.

As discussed above, the storage device specification can include certain preferred or required characteristics of the system to be provisioned. In accordance with one illustrative embodiment of the present invention, if a provisioning request requires certain storage system characteristics that cannot be met by the physical resources available to the automated provisioning process, the automated process will return an error in response to the request, explaining that the request cannot be met. Furthermore, in addition to providing the requestor with the ability to require that certain characteristics be met, one embodiment of the present invention also allows a user to specify preferences that are not absolute requirements. In one embodiment, in response to a request that includes a preference, the automated provisioning process attempts to satisfy the preference, but if it is unable to do so, it implements the provisioning request if possible in other ways that do not satisfy the preferences, but still satisfy all requirements set forth in the provisioning request.

It should be appreciated that the provisioning request can be employed to reconfigure a computer system. On some computer systems, logical volumes are already assigned to a particular use, such as a "standard" logical volume available for read/write operations, a dedicated spare for temporary use, a volume dedicated to being used as a snapshot mirror such as a business continuance volume (BCV) available from EMC Corporation, a volume available for remote mirroring, etc. In one embodiment of the invention, when providing the storage device specification, a requester can indicate a tolerance for reconfiguring of any of these volume types. For instance, by specifying a low (or no) tolerance for certain reconfiguration operations, a user may prevent the automatic provisioning process from changing the configuration of any of the logical volumes that currently exist, and return an error message if the storage device specification cannot be met using the current configuration of logical volumes. Alternatively, a relatively high tolerance to reconfiguration may authorize the automated provisioning process to change, if desired, the configuration of one or more logical volumes to meet the storage device specification.

B. Host Logical Unit Specification

Figure 3:
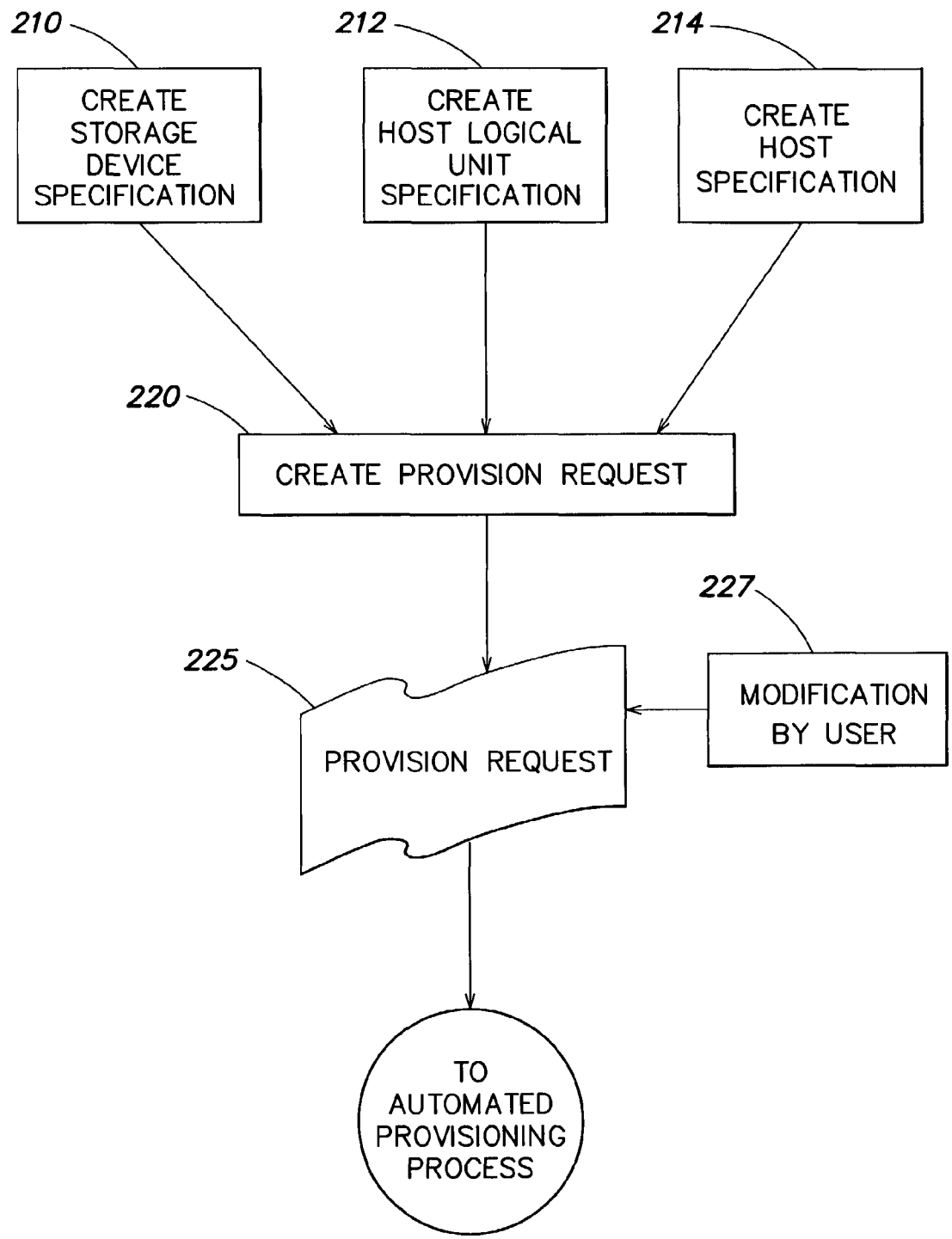
FIG. 3 conceptually illustrates the creation a provisioning request in accordance with one embodiment of the invention.
Figure 4:
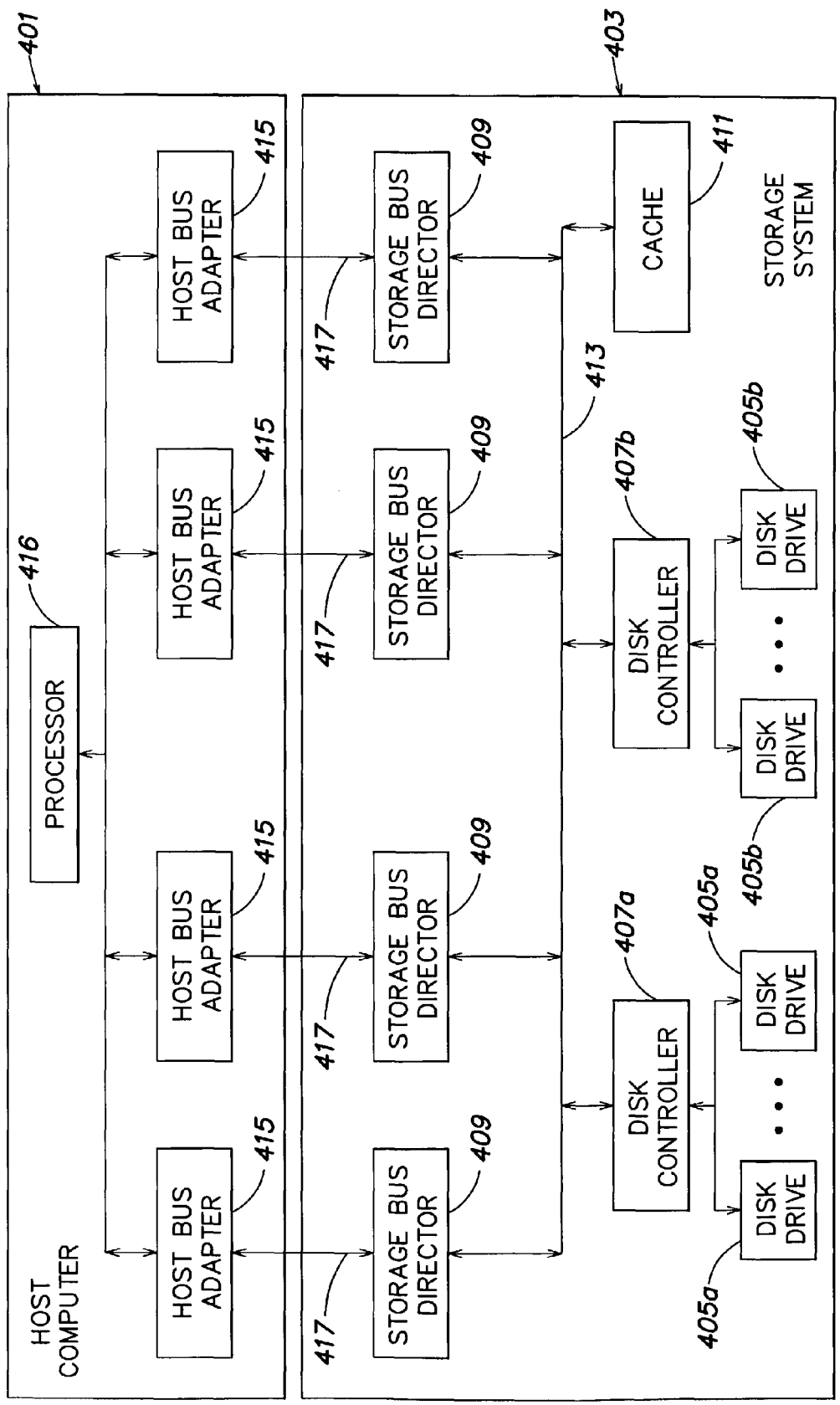
FIG. 4 is a block diagram illustrating an exemplary computer system that includes a host computer and a storage system of the type that can be employed in a computer system provisioned according to various embodiments of the present invention.
Figure 5:
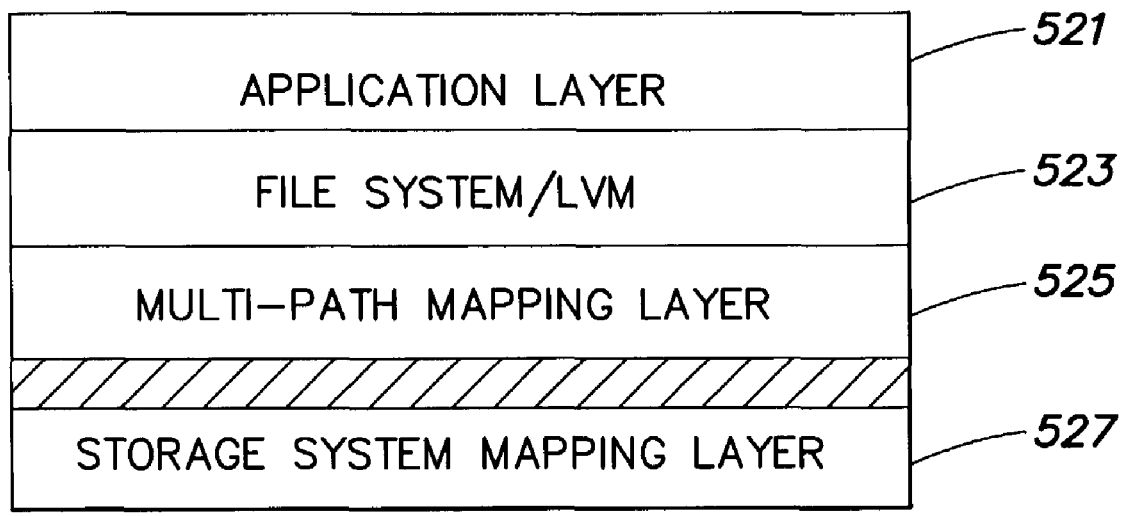
FIG. 5 illustrates a number of software layers that can be employed in a computer system such as that shown in FIG. 4.

A second aspect of the provisioning request is the host logical unit (HLU) specification created in block 212 (FIG. 3). The HLU specification defines how volumes of storage, defined in the storage device specification, will appear, via connectivity resources (e.g., a network), to host computers on the system. As with the storage device specification discussed above, the HLU specification can be provided at any level of detail that the requestor desires, such that if it is unimportant to the requestor how various aspects of the system configuration will be implemented, those aspects need not be defined in the HLU specification, and the automated provisioning process will implement those aspects in any manner that it chooses. An example of the type of information that can be defined in the HLU specification includes a mapping of the logical volumes defined in the storage device specification to particular ports of the storage systems in which the volumes will be implemented. For example, referring to FIG. 1, each of the logical volumes 66, 77 is mapped (as indicated by one of the dotted lines) to one of the ports 65, 75 of the storage systems 6, 7.

Another example of the information that can be included in the HLU specification is an identification of which ports 15, 25 of the host computers 1, 2 will have particular logical volumes made available to them, as well as any security measures provided wherein access to particular volumes of storage may be limited to certain host computers.

Another example of information that can be included in the HLU specification is a definition of the number of paths that may preferably exist between a logical volume and a host computer that accesses it. In this respect, it should be appreciated that many host computers will include a multi-pathing layer that provides the capability to allow multiple different paths to be used for accessing a particular logical volume. Thus, if a multi-pathing configuration is desired, this can be specified in the HLU specification.

It should be appreciated that the considerations listed are provided for illustrative purposes only and are not intended to be exhaustive, as any type of characteristic of the connectivity of the computer system can be included in the HLU specification.

It should be appreciated that the provisioning request may be used to reconfigure a computer system that has an existing configuration. For example, physical connections between host computers, networking components, and storage systems may already exist. As mentioned above in connection with the storage device specification, in one embodiment of the present invention, certain elements specified by the HLU specification can be provided as preferences rather than absolute requirements. In this embodiment, a user may express a preference for using aspects of an existing computer system configuration by specifying a tolerance for various reconfiguration operations that would need to be performed to meet the desired configuration set forth in the HLU specification. For example, in an existing configuration, one or more logical volumes may be mapped to certain storage system ports, and may also be zoned for access by certain host computers. It should be appreciated that the process of mapping a logical volume to a port can be time consuming, as can the process for zoning a particular logical volume for access by a particular host computer. Thus, in accordance with one embodiment of the present invention, the HLU specification can indicate a tolerance for re-mapping and/or re-zoning of the existing computer system configuration to meet the desired HLU specification.

Tolerancing can provide a range of options for the automated provisioning process. For example, if an HLU specification indicates a low (or no) tolerance for re-mapping and/or re-zoning, then the automated provisioning process will only provision volumes that are already pre-mapped and/or pre-zoned in a way that satisfies the HLU specification. If the HLU specification cannot be met using pre-mapped and/or pre-zoned logical volumes, then the provisioning request will fail. Alternatively, if the HLU specification indicates a high tolerance for re-mapping and/or re-zoning, the automated provisioning process may attempt to satisfy the HLU specification by using pre-mapped and/or pre-zoned logical volumes, but if it is unable to do so, may take steps (which can be implemented in a manner discussed below) to re-map and/or re-zone logical volumes where necessary or desired to meet the HLU specification. As discussed above, there may be a configuration time that will be incurred to perform re-mapping and/or re-zoning, so that the requester can take this into consideration when determining the tolerances for these operations, as expressed in the HLU specification.

C. Host Specification

The host specification of the provisioning request created in block 214 (FIG. 3) defines the ways in which logical volumes made available to host computers 1, 2 (FIG. 1) will be used by those host computers. In the example in FIG. 1, each of the logical volumes presented to the host computer I is used to provide the storage space for a file system 16, and each of the logical volumes presented to host computer 2 are similarly employed to provide the storage space for file system 26. It should be appreciated that a host computer can use logical volumes in numerous ways, including using logical volumes to provide storage for a logical volume manager (LVM), a database management system, or to provide direct access to raw logical volumes. The present invention is not limited in any way to the manner in which host computers may make use of logical volumes provided to it, and the host specification can define any desired use for these logical volumes for the host computers in the computer system.

2. Creation of the Provisioning Request

The provisioning request can be created (e.g., block 220 in FIG. 3) in any of numerous ways, as the present invention is not limited to any particular creation technique. The creation of the provisioning request can be performed entirely manually (e.g., by a system administrator seeking to define the desired configuration for a computer system in the manner discussed above), or alternatively, can be created in an essentially entirely automated fashion by reverse engineering a current computer system configuration that is desired to be replicated. It may be desirable to replicate an existing computer system configuration for any of numerous reasons. One particular application in which replication may be desirable is when a data migration is being performed from one storage system to another. For example, it may be desirable to move an entire logically related set of data (e.g., a file system, an LVM or a database) from one storage system to another for any of numerous reasons, such as if the existing storage system is limited in capacity and/or performance.

It should be appreciated that when the provisioning request is to be created manually, it can be created in any desirable manner. For example, a system administrator can simply enter data into any computer in a form that is readable by (or convertible into a form that is readable by) the automated provisioning process, so that the provisioning request can be input into the automated provisioning process.

Reverse engineering (also referred to herein as source discovery) of an existing computer system configuration can be performed in any of numerous ways, to provide a template for a new provisioning request, as the present invention is not limited to any particular implementation technique. As discussed above, some computer system configurations have a management resource that can be queried to gather information about the configuration of the computer system. An example of such a management tool is the ControlCenter/Open Edition suite of software products available from EMC Corporation (hereafter ECC management tool). The ECC management tool allows a user to view the configuration specifics of a computer system infrastructure. The ECC management tool employs a number of agents distributed throughout the computer system (e.g., on the hosts, the storage systems, and the network components) which use application programming interfaces (APIs) to communicate with a central management agent that collects the information and compiles it in a data set (e.g., a database) that provides a description of the infrastructure of the computer system. In one embodiment of the present invention, source discovery of a system configuration can be performed by querying the FCC management tool to provide the desired information about the configuration of an existing computer system managed by the ECC management tool. In one embodiment of the present invention, the automated provisioning process can be implemented as part of the ECC management tool, such that the source discovery step can be performed automatically in response to a user requesting provisioning of a new computer system based on an existing system. In one embodiment, the present invention described herein can query the database maintained by the FCC management tool to extract the necessary information desired to build a provisioning request for passing to the automated provisioning process in the manner discussed herein.

It should be appreciated that the embodiment of the present invention related to the reverse engineering or source discovery of an existing computer system is not limited to use with the FCC management tool, as numerous other techniques can be employed. For example, if a computer system has another type of management system associated with it that includes a data set containing the desired information relating to the infrastructure of the computer system, the information can be gathered from that management tool. Alternatively, if no centralized management tool exists that has collected the relevant information relating to the infrastructure of the computer system, a number of different tools can be employed to gather configuration information separately from the various components in the computer system. For instance, some network components and storage systems provide APIs that enable the component to be queried and to provide configuration information of the type desired to build the automated provisioning request as described herein. Furthermore, tools such as those available through the WideSky Storage Management Facility (including the EMC Symm API-Mapper application programming interface) available from EMC Corporation are available that allow for the discovery of configuration information within a host, such as which logical volumes are assigned as storage resources for various components (e.g., a file system, LVM or database) on the host. In short, any of a number of tools may be used to collect the desired information from the components of the computer system to provide a template for a new provisioning request, as the present invention is not limited to any particular implementation technique.

As discussed above, in one embodiment of the present invention used on computer systems wherein management techniques are employed to pool together storage resources having common characteristics, the source discovery process can seek to identify whether various storage resources in the existing computer system being reverse engineered belong to certain storage pools, and if so, that information can be provided in the provisioning request automatically generated by the source discovery process. Although advantageous, it should be appreciated that the present invention is not limited in this respect, as the aspect of the present invention relating to automatically performing a source discovery is not limited to identifying the use of any storage pools.

After source discovery, it may be desirable in some circumstances for a system administrator to modify a definition of the computer system configuration (block 227 in FIG. 3) prior to submitting it as a provisioning request (block 225 in FIG. 3) to the automated provisioning process. These modifications can be of any type, as there may be numerous circumstances where it may be desirable to model a new computer system configuration based upon an existing one, but with modifications of various types. Thus, the present invention is not limited in any way to the manner in which a definition of a computer system configuration may be modified to create a provisioning request. In the illustrative example discussed above wherein it may be desirable to migrate a data set from one storage system to another, the modifications to the definition of the computer system output from the automatic source discovery process may simply involve modifying the unique identifiers of the storage systems (or singular storage system) on which the logical volumes that stored the data set are stored, as the remainder of the computer system may be replicated exactly.

Another example wherein it may be desirable to modify a definition of a computer system configuration prior to submitting it as a provision request relates to extending a file system. In such a circumstance, a system administrator may find it desirable to expand the file system using consistent storage resources (e.g., storage resources provided on a same storage system, having a same RAID level of protection, etc.). Thus, in accordance with one embodiment of the present invention, a system administrator seeking to extend a file system may perform source discovery on the existing system to identify the relevant characteristics of the storage resources used therefor, and modify the output from the automatic source discovery process to define an expanded file system consistent therewith.

3. Automatic Provisioning Process

After the provisioning request has been created (automatically, manually or through a combination thereof), in one embodiment, the provisioning request serves as an input to an automatic provisioning process that automatically provisions a computer system to satisfy the definition provided in the request. In accordance with the embodiment of the present invention depicted in FIG. 2, the automatic provisioning process includes three primary acts: resource selection, transaction creation and transaction execution. Resource selection involves identifying and selecting resources (such as storage systems, connectivity components and host computer resources) to fulfill the provisioning request. Transaction creation involves creating a program or log of commands that, when executed, perform the configuration acts that will configure the computer system as defined in the provisioning request. Transaction execution involves actually executing the acts to configure the computer system. Each of these portions of the automatic provisioning process is discussed in greater detail below.

A. Resource Selection

Figure 2:
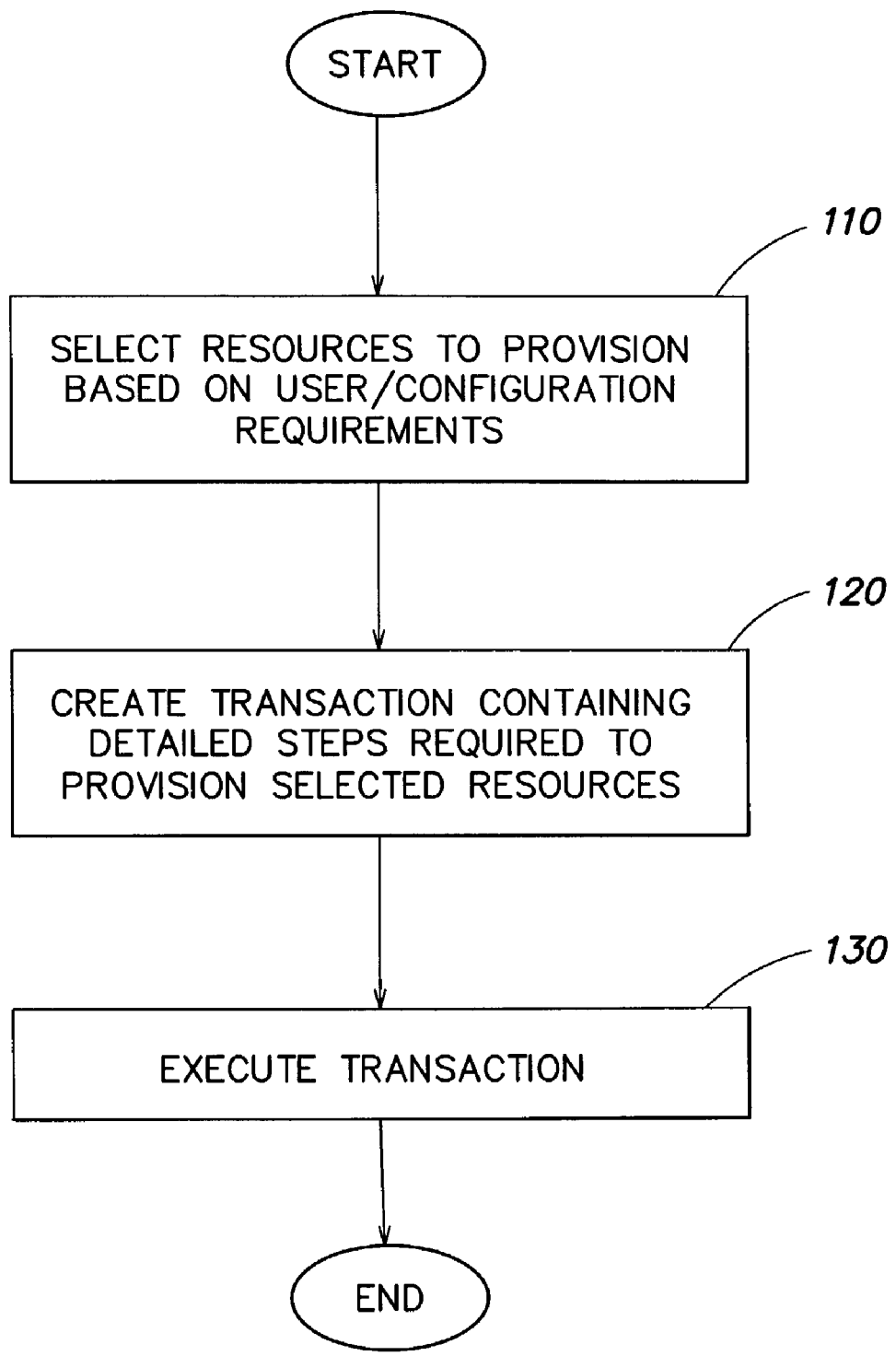
FIG. 2 is a flowchart depicting a process whereby computer system resources are provisioned in accordance with one embodiment of the invention.

Referring to FIG. 2, in act 110, resource selection is performed. Resources may include, for example, one or more host computers, storage systems, networking components and logical volumes. The resources are selected to fulfill the specifications set forth in the provisioning request.

The identification of the resources available to meet the provisioning request can be performed in any of numerous ways, as the present invention is not limited to any particular implementation technique. In accordance with one embodiment of the present invention for use in a system that includes a management system such as the ECC management tool discussed above, the management tool (e.g., its database) can be queried to discover the resources available for selection to meet the provisioning request. In accordance with the embodiment of the present invention wherein the automated provisioning process is implemented within the ECC management tool, the resource selection process can be performed, for example, by issuing queries to the database to retrieve the desired information.

For the embodiment of the present invention wherein a database is provided that stores information relating to the available resources, the capabilities of the database (e.g., the execution of SQL queries and use of database views) may be employed to optimize and expedite the resource selection process. For example, the database may store information concerning all physical elements (e.g., disks, connectivity equipment) and logical elements (e.g., LUNs) in the computer system. One or more database "views" can be implemented to pre-select portions of the database (defined by the view) against which queries can be executed, to make the execution of queries simpler and more efficient. For example, a database view might be employed to pre-select elements which have previously established physical communication connections, so that a query selects from only that subset. A database view might alternatively, or additionally, be employed to pre-select storage elements possessing other characteristics (e.g., zoned storage elements, or elements belonging to a storage pool).

It should be appreciated that the resource selection aspect of the invention is not limited to the use of database views or dynamically generated SQL queries which are executed against a relational database, as any suitable technique for gathering the desired information can be employed. For example, automated resource selection may be accomplished using any of a number of programmatic techniques (e.g., by translating selection criteria into a series of parameters to serve as input to one or more computer programs that execute against one or more data sets, or any of a myriad of other automated techniques). Manual techniques may also be employed, as well as combinations of automated and manual techniques.

In computer systems wherein a central management tool with an existing database of the resources included in the computer system is not available to be queried, other techniques can be employed to discover the resources available to meet the provisioning request. For example, if a management tool exists that provides a centralized API that can be queried to discover the resources in the computer system (e.g., the host computers, the network components and the storage systems), such a centralized API can be used to perform the resource discovery and selection process. If no such centralized management tool is available, most computer system components have their own APIs available that can be queried to gather information concerning the component, such as what type of component it is, the number of ports available, etc.

Figure 6:
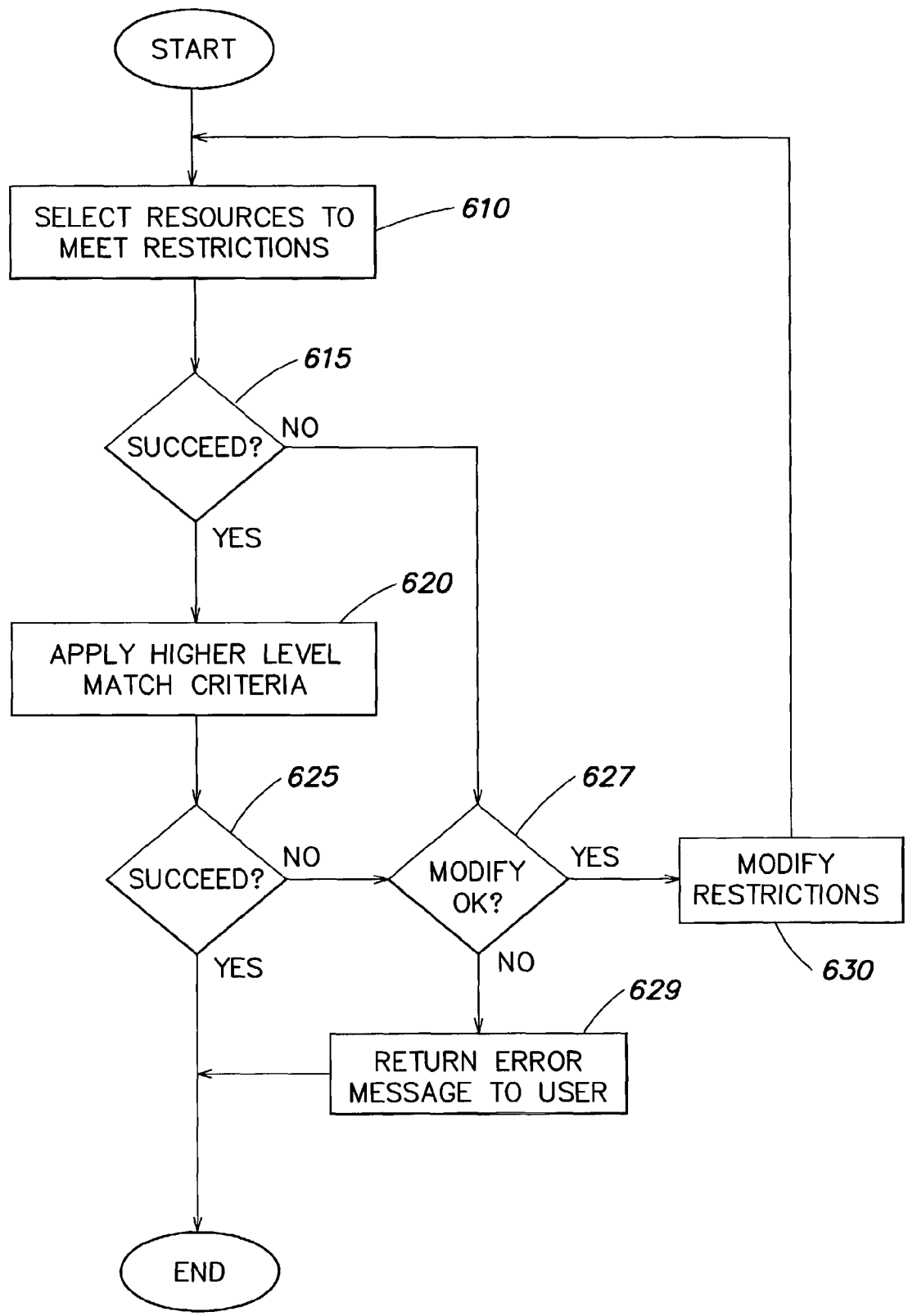
FIG. 6 illustrates a process for selecting resources to meet a provisioning request in accordance with one embodiment of the present invention.

According to the embodiment depicted in FIG. 6, the resource selection process is executed in three basic acts 610, 620, 630, which can also be considered as hierarchical layers, with act 610 at the lowest layer and act 630 at the highest.

In act 610, storage elements are selected to satisfy the low-level criteria specified in the storage element descriptor, such as numbers of storage elements (e.g., logical volumes), the size of the storage elements, any particular requirements for physical storage devices for the storage elements, etc. As will be discussed below, some higher level requirements relating to a logical interaction of multiple storage elements is performed in the middle layer of the hierarchy at act 620.

As mentioned above, the act 610 attempts to select resources to satisfy the criteria presented to it. In accordance with one embodiment of the present invention, during an initial pass of the resource selection process of FIG. 6, the criteria provided to the act 610 incorporate the strictest constraints specified in the storage element descriptor. For example, if a provisioning request indicates some tolerance for re-zoning devices, in one embodiment of the present invention, during a first pass of the resource selection process of FIG. 6, the act 610 attempts to select resources to meet all of the criteria, including using only zoned devices. In accordance with one embodiment of the present invention, the act 610 seeks to locate all of the resources that satisfy the storage element descriptor, and creates partitions with the storage resources, with each partition including storage elements that are essentially identical for the relevant characteristics specified in the storage element descriptor. Thus, each of the storage resources within a particular partition can be considered to be interchangeable in terms of satisfying the storage element descriptor, as they share the relevant common characteristics. By selecting all of the available resources that can potentially be used to satisfy the storage element descriptor, the likelihood of the middle layer of the hierarchy at act 620 finding compatible resources to satisfy the higher level criteria is maximized. Although advantageous, it should be appreciated that the present invention is not limited in this respect, and that rather than identifying all of the storage resources that may be used to satisfy the storage element descriptor in act 610, a subset can be identified (e.g., only the minimum number can be identified), and then additional iterations can be performed in a manner similar to that discussed below.

After completion of the act 610, the process proceeds to act 615, wherein a determination is made as to whether resources have been selected that satisfy all of the low-level requirements specified in the storage element descriptor. When all of the requirements have been met, the process proceeds to act 620, wherein the higher-level requirements relating to a logical association of multiple storage elements are considered in a manner discussed below. Alternatively, when it is determined at act 615 that sufficient resources could not be selected to satisfy the low-level requirements for the storage element descriptor, the process proceeds to act 627, wherein a determination is made as to whether the criteria for the storage element descriptor can be modified or relaxed. If not, the process proceeds to act 629, wherein an error message is returned indicating that the provisioning request cannot be satisfied as specified. At that point, a system administrator can evaluate whether to modify the provisioning request (e.g., by relaxing tolerances, reducing the amount of storage requested, relaxing performance characteristics, etc.).

When it is determined at act 627 that modification of the request is possible, which may occur if tolerances are specified that provide some room for flexibility, the process proceeds to act 630, wherein the criteria for the storage element descriptor are modified, and then the modified criteria are resubmitted to the act 610 to determine whether sufficient resources can be provided to meet the modified criteria. An example of the manner in which the criteria for the storage element descriptor can be modified relates to tolerances. As discussed above, in accordance with one embodiment of the present invention, during the first pass through the resource selection process, the strictest constraints are applied, so that, if at all possible, the system can be configured to meet the preferences specified in the provisioning request. However, if the provisioning request indicates a preference for a certain characteristic, but a tolerance for having it not met, then the act 630, which implements the top layer in the hierarchy as discussed above, can relax one or more of the constraints within the bounds of the tolerances specified in the provisioning request, and resubmit the request to the lower layers on the hierarchy to determine whether a system can be configured that satisfies the relaxed constraints. In this respect, it should be appreciated that by relaxing certain constraints prior to resubmitting the criteria to the act 610, there is a possibility that a greater number of storage resources can be found that will meet the newly relaxed criteria.

It should be appreciated that the present invention is not limited in any manner to the way in which the top layer in the hierarchy (implemented by act 630) may relax constraints, as numerous implementations are possible. For example, the act 630 can begin by initially relaxing constraints for which the storage provisioning request indicates the highest tolerance for such relaxation.

As mentioned above, when it is determined at act 615 that sufficient resources have been identified to satisfy the low-level requirements for the storage elements at act 610, the process proceeds to act 620, which implements the second layer in the hierarchy to determine whether certain criteria relating to the logical relationship between two or more storage elements can be met using the resources selected in the act 610. There are numerous types of constraints that can be specified in a storage element descriptor and considered in the act 620. Examples include mirroring relationships such as a local or remote mirror. For example, for a snapshot mirror it is desirable to have two storage resources of the same size and type stored on the same physical storage system, and for a remote mirror it is desirable to have two storage volumes of the same size located on different storage systems. This is merely one example of the interrelationship between two or more storage elements that can be considered by the act 620, as there are numerous other possibilities.

It should be appreciated that in accordance with one embodiment of the present invention, if appropriate capabilities are provided by the hardware in the computer system, certain functions that might otherwise be considered to be high level can be implemented at the lower-level act 610. For example, if the computer system includes intelligent storage systems that have the capability of providing hardware mirrored devices, the request for a mirrored configuration in the storage element descriptor can, in one embodiment of the present invention, be met at the lowest-level act 610. Thus, the partitions created thereby can include mirrored sets of devices, such that this logical relationship need not be addressed at the higher level act 620. Of course, it should be appreciated that the present invention is not limited in this respect, and that mirroring relationships can, alternatively, be addressed at the higher level act 620.

Furthermore, it should be appreciated that the mirroring function is merely one example of the capability that may be provided by the hardware in the computer system and can be implemented at the lower-level act 610.

In one embodiment, the act 620 seeks to satisfy the storage element descriptor by identifying specific storage resources from among the partitions provided by the act 610. After the higher level criteria has been evaluated at act 620, the process proceeds to act 625, wherein a determination is made as to whether the higher level criteria specified in the storage element descriptor have been met. If so, specific storage resources that can be used to implement the desired computer system will have been identified in the act 620, and the process will terminate.

Alternatively, when it is determined at act 625 that the resources selected at act 610 are not sufficient to enable the higher level criteria to be met, the process proceeds to act 627, wherein a determination is made as to whether the selection criteria can be relaxed, in the manner discussed above.

It should be appreciated from the foregoing that the process illustrated in FIG. 6 can be an iterative one, wherein attempts are first made to satisfy the storage element descriptor with the tightest possible constraints, and wherein these constraints can be relaxed, under control of the highest level in the hierarchy (implemented at the act 630), through one or more additional iterations of the process, until the storage element descriptor has been satisfied, or until a determination is made that sufficient resources are not available to satisfy the storage element descriptor.

The invention is not limited to performing the above-described acts in the sequence described, or in any sequence at all. Some embodiments may accomplish resource selection using a process comprising a different number of acts than that described, and comprising acts which may be performed serially, in parallel, or a combination of the two.

In short, any suitable technique that enables the identification of resources within a computer system, and that provides information desirable for determining which resources will comply with the provisioning request, may be used to perform resource selection, as the present invention is not limited to any particular implementation technique.

Although all of the steps of the provisioning process illustrated in FIG. 2 are automated in one embodiment of the present invention, it should be appreciated that the present invention is not limited in this respect, and that some of these acts (including the resource selection act) can include manual activity, or can be performed entirely manually.

B. Transaction Creation

In act 120, a transaction is created that sets forth a series of actions to be performed to configure the computer system in a manner that meets the definition provided in the provisioning request. The types of actions in the transaction may include any of the types discussed above, such as mapping logical volumes to various ports from which they are to be visible, providing security measures to restrict access as specified in the provisioning request, commanding host computers to scan their ports to recognize logical volumes made available to the host computers over those ports, allocating one or more logical volumes to a file system, LVM, database or other host computer resource, configuring the logical volume type (e.g., a standard storage volume, a mirror, a hot spare, etc.), creating any desired mirroring configurations, etc. The transaction includes a number of actions, including low level actions that are performed to physically configure the computer system to meet the provisioning request.

It should be appreciated that the precise nature of the actions to be built into the transaction will vary depending upon the specific nature of the components in the computer system. For example, host computers may have different types of operating systems that support different configuration actions, and different types of storage systems and networking components may similarly support different types of configuration actions.

In accordance with one embodiment of the present invention, the transaction is assembled not simply in a brute force manner to achieve the end result of configuring the computer system in a manner that satisfies the provisioning request, but other considerations are taken into account, including efficiency of the configuration process when the transaction is executed. For example, time is incurred in a host computer scanning its I/O ports to identify new logical volumes that have been made available over those ports. Thus, in configuring a computer system, it is desirable to minimize the number of times that a host computer will perform such a scan, such that rather than making logical volumes available to a host and scanning them one at a time, it may be desirable, for example, to perform actions that make a plurality of logical volumes being assigned to a host computer available, and to then perform a single scan operation that identifies all of these logical volumes. It should be appreciated that this is provided merely as an example, as other situations may exist where effectively planning the sequence of operations in a transaction can lead to efficiencies in the execution of the transaction.

Although desirable, it should be appreciated that the present invention is not limited to organizing the transaction to achieve efficiency in its execution, as the transaction can be created and executed in any way that is effective in configuring the computer system to meet the provisioning request.

In one embodiment, during creation of the transaction, intelligence is provided to identify whether certain configuration steps are necessary. For example, if a logical volume has already been mapped to a particular port, an operation need not be included in the transaction to perform such mapping.

Furthermore, in accordance with one embodiment of the present invention, when the transaction is created, safety checks are performed to ensure that resources are not inconsistently assigned. For example, a check can be performed to ensure that a logical volume is not inconsistently allocated to multiple resources, which could result in a loss of data.

In accordance with one embodiment of the present invention, a capability is provided to undo one or more of the operations performed by the transaction in physically configuring a computer system to meet the requirements of the provisioning request. In this respect, it should be appreciated that the provisioning of a computer system may be an iterative process, wherein an administrator initially may decide to perform a certain configuration operation, but thereafter detect an unintended result and wish to undo the operation. Thus, in accordance with one embodiment of the present invention, the entire provisioning transaction can be undone. In accordance with another embodiment of the present invention, a subset of the operations performed during the transaction (including in one embodiment down to the level of each operation) can be undone. In this manner, after the transaction is executed, or during its execution, the transaction can be rolled back to any desired place in the transaction.

It should be appreciated that the embodiment of the present invention that provides the ability to undo the transaction is optional, as all embodiments of the present invention are not limited to providing this capability. Furthermore, it should be appreciated that the ability to undo or rollback a transaction can be implemented in any of numerous ways, as the present invention is not limited to any particular implementation technique.

In accordance with one embodiment of the present invention, the undo and/or rollback feature can be implemented by creating a rollback routine at the same time the transaction is created. Thus, during creation of the transaction, for each operation created, a parallel operation is created to undo it. In this manner, the entire transaction can be undone by executing the entire parallel undo transaction, or the transaction can be rolled back to any particular operation by executing only the corresponding undo operations in the parallel undo transaction.

It should be appreciated that the nature of the operations created during the transaction creation process will vary depending upon the physical components in the computer system. As discussed above in connection with the resource selection process, central management tools and/or separate interfaces for each of the system components can be employed to discover these resources. Similarly, in some computer systems, a central management tool may be provided that enables an administrator to configure the entire system by dealing only with the central management tool. When the system to be provisioned includes such a central management tool, the operations created during the transaction creation process can be directed to that central management tool and conform to the communication protocol used thereby. Alternatively, the separate APIs provided by each of the system components can be used for performance of the desired operations created during the transaction creation process.

It should be appreciated that the transaction creation process is not limited to performing operations of any particular type, as any suitable operation that, when executed, performs the desired configuration actions can be employed.

Similarly, the transaction and the operations included therein can take any of numerous forms, and can be written in any computer-readable language or format.

In the embodiments discussed above, a single transaction is created to perform all of the provisioning desired for an entire computer system. It should be appreciated that the present invention is not limited in this respect, and that multiple separate transactions can alternatively be created and executed to provision portions of the desired computer system.

C. Transaction Execution

After the transaction is created in act 120, the automated provisioning process proceeds to act 130, wherein the transaction is executed. As discussed above, in one embodiment of the present invention, the transaction includes a series of operations in computer-readable form, such that the execution thereof can comprise a computer executing the software code that performs the desired operations. In one embodiment of the present invention, all of the operations recited in the transaction can be executed by a server or host computer in the computer system which implements management control functions for the computer system (e.g., a server executing the ECC management tool discussed above). However, it should be appreciated that the present invention is not limited in this respect, and that the transaction can alternatively be executed on any suitable component within the computer system, including host computers, a storage system, a network component, etc., as any component of the computer system that includes a processor may be capable of executing the transaction. Furthermore, it should be appreciated that the present invention is not limited to having all of the operations in the transaction executed by a single system component, as the transaction can alternatively be split among multiple different components within the computer system that can each execute some of the operations of the transaction.

As discussed above, while it is advantageous to create (in act 120) and execute (in act 130) a transaction that performs all of the provisioning operations desired for a computer system, the present invention is not limited in this respect, as a transaction can be created and executed that can alternatively automatically perform only a subset of the provisioning operations for a particular computer system.

In accordance with one embodiment of the present invention, the act 130 of executing the transaction is performed automatically in response to completion of the act 120 of creating the transaction, which is in turn performed automatically in response to completion of the act 110 of resource selection. This is advantageous, in that the entire provisioning process is automated. However, it should be appreciated that all embodiments of the present invention are not limited in this respect, and that manual intervention can be performed between the resource selection act 110 and the transaction creation act 120, and/or between the transaction creation act 120 and the transaction execution act 130. For example, a system administrator may desire to examine, and potentially modify, the transaction created in act 120, prior to execution in act 130. Furthermore, in one embodiment of the invention, one or more manual operations may be placed within a transaction which is otherwise executed automatically in act 130. In this embodiment, a portion of the transaction may be automatically executed before one or more manual operations is reached, and automatic execution may be paused or suspended until a user performs the manual operation(s). Upon receiving confirmation that the manual operation(s) are complete, automatic execution of transaction steps may be resumed. An example of a circumstance where it may be desirable to insert one or more manual steps is when actions by an administrator are desired before a transaction can complete. For example, when automatically provisioning a file system extension, it may be desirable to shut down or restart an application to recognize the newly extended file system.

The above-described embodiments of the present invention can be implemented in any of numerous ways. For example, the above-discussed functionality can be implemented using hardware, software or a combination thereof. When implemented in software, the software code can be executed on any suitable processor or collection of processors, whether provided in a single computer or distributed among multiple computers. It should further be appreciated that any component or collection of components that perform the functions described above can be generically considered as one or more controllers that control the above-discussed functions. The one or more controllers can be implemented in numerous ways, such as with dedicated hardware, or by employing one or more processors that are programmed using microcode or software to perform the functions recited above.

In this respect, it should be appreciated that one implementation of the embodiments of the present invention comprises at least one computer-readable medium (e.g., a computer memory, a floppy disk, a compact disk, a tape, etc.) encoded with a computer program (i.e., a plurality of instructions), which, when executed on a processor, performs the above-discussed functions of the embodiments of the present invention. The computer-readable medium can be transportable such that the program stored thereon can be loaded onto any computer system resource to implement the aspects of the present invention discussed herein. In addition, it should be appreciated that the reference to a computer program which, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

While the invention has been particularly shown and described with reference to specific embodiments, these embodiments are presented by way of example only, as it is not practical to enumerate all potential implementations. It should be understood by those skilled in the art that various changes in form and detail may be made therein without departing from the spirit and scope of the invention, which is defined in the following claims.

The invention claimed is:

1. A method, of provisioning at least a portion of a computer system to meet a specification provided in a provisioning request, the method comprising:
   reading the provisioning request, wherein the provisioning request includes physical requirements for one or more storage elements and requirements relating to a logical association of the one or more storage elements; and
   automatically provisioning the at least a portion of the computer system to meet the specification provided in the provisioning request, including automatically provisioning at least one-resource from at least one host computer, at least one resource from at least one storage system, and at least one resource from at least one connectivity resource that connects the at least one host computer to the at least one storage system, wherein the provisioning request specifies a provisioning preference and said automatically provisioning attempts to implement the provisioning request satisfying the provisioning preference, and if unable to implement the provisioning request and satisfy the provisioning preference, said automatically provisioning includes processing to implement the provisioning request without satisfying the provisioning preference, wherein said automatically provisioning further includes performing first processing, said first processing including:
   selecting a set of one or more resources;
   determining whether the set satisfies the physical requirements, wherein if it is determined that the set does not satisfy the physical requirements, the physical requirements are modified, another set of one or more resources is selected, and it is determined whether the another set satisfies the modified physical requirements; and
   wherein, after a first set of resources is determined that satisfies the physical requirements or a modified set of the physical requirements, it is determined whether the first set also satisfies the requirements relating to a logical association, and wherein if it is determined that the first set does not satisfy the requirements relating to a logical association, any of the physical requirements and the requirements relating to a logical association are modified, and additional processing is performed to select resources satisfying the provisioning request.

2. The method of claim 1, wherein each of the at least one host computer, the at least one storage system and the at least one connectivity resource comprises a plurality of resources, and wherein the said automatically provisioning further comprising:
selecting the at least one resource from among the plurality of resources for each of the at least one host computer, the at least one storage system and the at least one connectivity resource to identify selected resources to satisfy the provisioning request;
creating a transaction that comprises a series of actions to configure the selected resources to satisfy the provisioning request; and
executing the transaction to configure the selected resources in a manner that satisfies the provisioning request.

3. The method of claim 2, wherein the at least one storage system presents logical volumes of storage usable by at least one entity in the at least one host computer to store information, the at least one entity including at least one of a file system, a logical volume manager and a database manager, and wherein said creating a transaction comprises creating a transaction that allocates at least one of the logical volumes to the at least one entity in the at least one host computer.

4. The method of claim 2, wherein the at least one storage system presents logical volumes of storage usable by at least one entity in the at least one host computer to store information, and wherein said creating a transaction comprises creating a transaction that assigns at least one of the logical volumes to at least one port of the at least one host computer through which the at least one of the logical volumes will be accessible to the at least one entity.

5. The method of claim 2, wherein said selecting the at least one resource comprises selecting at least one logical volume of storage, presented by the at least one storage system, to be used by the at least one host computer to store information to satisfy the provisioning request.

6. The method of claim 5, wherein said creating a transaction comprises creating a transaction that configures the selected at least one logical volume to satisfy the provisioning request.

7. The method of claim 6, wherein said creating a transaction comprises creating a transaction that configures the selected at least one logical volume to serve as a spare volume available for dynamic assignment.

8. The method of claim 5, wherein said selecting the at least one resource comprises considering performance characteristics of the at least one logical volume in determining that the selected at least one logical volume can be used to satisfy the provisioning request.

9. The method of claim 5, wherein said selecting the at least one resource comprises considering a storage capacity of the at least one logical volume in determining that the selected at least one logical volume can be used to satisfy the provisioning request.

10. The method of claim 2, wherein the at least one storage system presents logical volumes of storage that can be used to store information, and wherein said creating a transaction comprises creating a transaction that maps at least one of the logical volumes to at least one port of the at least one storage system through which the at least one of the logical volumes will be accessible.

11. The method of claim 10, wherein the at least one storage system has an existing configuration prior to said automatically provisioning in which the at least one of the logical volumes is mapped to a first port of the at least one storage system, and wherein said creating a transaction comprises creating a transaction that re-maps the at least one of the logical volumes to a second port of the at least one storage system that is different than the first port.

12. The method of claim 2, wherein the at least one storage system presents logical volumes of storage that can be used to store information, and wherein said creating a transaction comprises creating a transaction that creates a mirrored relationship between at least two of the logical volumes.

13. The method of claim 2, wherein the at least one storage system presents logical volumes of storage that can be used to store information, and wherein said creating a transaction comprises creating a transaction that configures a communication path through the at least one connectivity resource to make at least one of the logical volumes accessible to the at least one host computer to store information.

14. The method of claim 13, wherein said creating a transaction comprises creating a transaction that configures at least two parallel communication paths through the at least one connectivity resource to make the at least one of the logical volumes accessible to the at least one host computer.

15. The method of claim 2, wherein the at least one host computer comprises a plurality of host computers, wherein the at least one storage system presents logical volumes of storage usable by the plurality of host computers to store information, and wherein said creating a transaction comprises creating a transaction that zones the computer system to provide access to at least one of the logical volumes only to a subset of the plurality of host computers.

16. The method of claim 15, wherein the computer system has an existing configuration, prior to said automatically provisioning, in which the computer system is zoned to provide access to the at least one of the logical volumes to a first subset of the plurality of host computers, and wherein said creating a transaction comprises creating a transaction that re-zones the computer system to provide access to the at least one of the logical volumes only to a second subset of the plurality of host computers that is different than the first subset.

17. The method of claim 2, wherein said selecting the at least one resource comprises:
determining what resources are available for selection to satisfy the provisioning request by querying the at least one host, computer, the at least one storage system and the at least one connectivity resource; and
selecting the at least one resource from among the plurality of resources for each of the at least one host computer, the at least one storage system and the at least one connectivity resource in response to the act of determining.

18. The method of claim 2, wherein the computer system comprises at least one data set that comprises information relating to resources, available from at least one of the at least one host computer, the at least one storage system and the at least one connectivity resource, and wherein said selecting the at least one resource comprises:
determining what resources are available to satisfy the provisioning request by querying the data set; and
selecting the at least one resource from among the plurality of resources for each of the at least one host computer, the at least one storage system and the at least one connectivity resource in response to the act of determining.

19. The method of claim 2, further comprising undoing at least some of the series of actions performed when executing the transaction.

20. The method of claim 19, wherein said undoing at least some of the actions comprises:
creating an undo transaction that comprises a series of undo actions that undo the series of actions created in said creating a transaction; and
executing at least some of the series of undo actions.

21. The method of claim 1, further comprising performing, prior to said reading and said automatically provisioning:
creating the provisioning request.

22. The method of claim 21, wherein said creating the provisioning request further comprises:
reverse engineering an existing computer system to create a specification of a configuration of the existing computer system; and
modifying the specification of the existing computer system to create the specification provided in the provisioning request.

23. The method of claim 22, wherein said creating the provisioning request is a computer-implemented.

24. The method of claim 1, wherein the at least one connectivity resource comprises at least one network resource that forms at least part of a network interconnecting the at least one host computer and the at least one storage system, and wherein said automatically provisioning further comprises automatically provisioning the at least one network resource.

25. The method of claim 1, wherein the at least one storage system presents a plurality of logical volumes of storage usable by at least one entity in the at least one host computer to store information, wherein the computer system has an existing configuration, prior to said automatically provisioning, in which at least some of the plurality of logical volumes presented by the at least one storage system is allocated to an entity in the at least one host computer, and wherein the method further comprises performing, prior to executing a transaction that allocates one of the plurality of logical volumes, determining that the one of the plurality of logical volumes is not already assigned to a different entity in the at least one host computer:

26. The method of claim 1, wherein if the provisioning request specifies an absolute provisioning requirement, an error is returned in response to the provisioning request if said automatically provisioning is unable to implement the provisioning request in accordance with the absolute provisioning requirement.

27. The method of claim 1, wherein the provisioning request includes at least one of host-based information, storage system-based information and connectivity information, said host-based information specifying how the at least one resource from the at least one storage system will be used by the at least one host computer, said storage system-based information specifying at least one aspect affecting selection of the at least one resource from the at least one storage system, said connectivity information specifying at least one aspect affecting selection of the at least one connectivity resource, and wherein said automatically provisioning automatically performs processing to determine one or more aspects of provisioning not specified in the provisioning request.

28. The method of claim 1, wherein the provisioning request includes host-based information, storage system-based information and connectivity information, said host-based information specifying how the at least one resource from the at least one storage system will be used by the at least one host computer, said storage system-based information specifying at least one aspect affecting selection of the at least one resource from the at least one storage system, said connectivity information specifying at least one aspect affecting selection of the at least one connectivity resource, and wherein said automatically provisioning automatically performs processing to determine one or more aspects of provisioning not specified in the provisioning request.

29. The method of claim 28, wherein said connectivity information includes information for at least one of: identifying one or more logical storage volumes of the at least one storage system to be accessible using a specified port of a host computer, specifying multiple paths over which a single host can access a set of one or more logical storage volumes of the at least one storage system, and a mapping of a logical storage volume of the at least one storage system to one or more ports of the at least one storage system.

30. The method of claim 1, wherein if the provisioning request includes first information specifying a first level of detail regarding any of the at least one resource from the at least one storage system and the at least one connectivity resource for use in connection with provisioning, said automatically provisioning is performed using the first information, and otherwise, if the provisioning request does not include the first information, specification of the first level of detail is performed automatically in processing comprising said automatically provisioning.

31. The method of claim 30, wherein the first information of the provisioning request includes information regarding the at least one connectivity resource identifying a mapping of a first logical volume to a port of a storage system and identifying which one or more ports of a host computer have accessibility to the first logical volume.

32. A non-transitory computer readable storage medium encoded with a computer program that, when executed, performs a method of provisioning at least a portion of a computer system to meet a specification provided in a provisioning request, the method comprising:
reading the provisioning request, wherein the provisioning request includes physical requirements for one or more storage elements and requirements relating to a logical association of the one or more storage elements; and
automatically provisioning the at least a portion of the computer system to meet the specification provided in the provisioning request, including automatically provisioning at least one resource from at least one host computer, at least one resource from at least one storage system, and at least one resource from at least one connectivity resource that connects the at least one host computer to the at least one storage system, wherein the provisioning request specifies a provisioning preference and said automatically provisioning attempts to implement the provisioning request satisfying the provisioning preference, and if unable to implement the provisioning request and satisfy the provisioning preference, said automatically provisioning includes processing to implement the provisioning request without satisfying the provisioning preference, wherein said automatically provisioning further includes performing first processing, said first processing including:
selecting a set of one or more resources;
determining whether the set satisfies the physical requirements, wherein if it is determined that the set does not satisfy the physical requirements, the physical requirements are modified, another set of one or more resources is selected, and it is determined whether the another set satisfies the modified physical requirements; and wherein, after a first set of resources is determined that satisfies the physical requirements or a modified set of the physical requirements, it is determined whether the first set also satisfies the requirements relating to a logical association, and wherein if it is determined that the first set does not satisfy the requirements relating to a logical association, any of the physical requirements and the requirements relating to a logical association are modified, and additional processing is performed to select resources satisfying the provisioning request.

33. The non-transitory computer readable storage medium of claim 32, wherein each of the at least one host computer, the at least one storage system and the at least one connectivity resource comprises a plurality of resources, and wherein said automatically provisioning comprises:

selecting the at least one resource from among the plurality of resources for each of the at least one host computer, the least one storage system and the at least one connectivity resource to identify selected resources to satisfy the provisioning request;

creating a transaction that comprises a series of actions to configure the selected resources to satisfy the provisioning request; and executing the transaction to configure the selected resources in a manner that satisfies the provisioning request.

34. The non-transitory computer readable storage medium of claim 33, wherein the at least one storage system presents logical volumes of storage usable by at least one entity in the at least one host computer to store information, the at least one entity including at least one of a file system, a logical volume manager and a database manager, and wherein said creating a transaction comprises creating a transaction that allocates at least one of the logical volumes to the at least one entity in the at least one host computer.

35. The non-transitory computer readable storage medium of claim 33, wherein the at least one storage system presents logical volumes of storage usable by at least one entity in the at least one host computer to store information, and wherein said creating a transaction comprises creating a transaction that assigns at least one of the logical volumes to at least one port of the at least one host computer through which the at least one of the logical volumes will be accessible to the at least one entity.

36. The non-transitory computer readable storage medium of claim 33, wherein said selecting the at least one resource comprises selecting at least one logical volume of storage, presented by the at least one storage system, to be used by the at least one host computer to store information to satisfy the provisioning request.

37. The non-transitory computer readable storage medium of claim 36, wherein said creating a transaction comprises creating a transaction that configures the selected at least one logical volume to satisfy the provisioning request.

38. The non-transitory computer readable storage medium of claim 37, wherein said creating a transaction comprises creating a transaction that configures the selected at least one logical volume to serve as a spare volume available for dynamic assignment.

39. The non-transitory computer readable storage medium of claim 36, wherein said selecting the at least one resource comprises considering performance characteristics of the at least one logical volume in determining that the selected at least one logical volume can be used to satisfy the provisioning request.

40. The non-transitory computer readable storage medium of claim 36, wherein said selecting the at least one resource comprises considering a storage capacity of the at least one logical volume in determining that the selected at least one logical volume can be used to satisfy the provisioning request.

41. The non-transitory computer readable storage medium of claim 33, wherein the at least one storage system presents logical volumes of storage that can be used to store information, and wherein said creating a transaction comprises creating a transaction that maps at least one of the logical volumes to at least one port of the at least one storage system through which the at least one of the logical volumes will be accessible.

42. The non-transitory computer readable storage medium of claim 41, wherein the at least one storage system has an existing configuration prior to performing said automatically provisioning in which the at least one of the logical volumes is mapped to a first port of the at least one storage system, and wherein said creating a transaction comprises creating a transaction that re-maps the at least one of the logical volumes to a second port of the at least one storage system that is different than the first port.

43. The non-transitory computer readable storage medium of claim 33, wherein the at least one storage system presents logical volumes of storage that can be used to store information, and wherein said creating a transaction comprises creating a transaction that creates a mirrored relationship between at least two of the logical volumes.

44. The non-transitory computer readable storage medium of claim 33, wherein the at least one storage system presents logical volumes of storage that can be used to store information, and wherein said creating a transaction comprises creating a transaction that configures a communication path through the at least one connectivity resource to make at least one of the logical, volumes accessible to the at least one host computer to store information.

45. The non-transitory computer readable storage medium of claim 44, wherein said creating a transaction comprises creating a transaction that configures at least two parallel communication paths through the at least one connectivity resource to make the at least one of the logical volumes accessible to the at least one host computer.

46. The non-transitory computer readable storage medium of claim 33, wherein the at least one host computer comprises a plurality of host computers, wherein the at least one storage system presents logical volumes of storage usable by the plurality of host computers to store information, and wherein said creating a transaction comprises creating a transaction that zones the computer system to provide access to at least one of the logical volumes only to a subset of the plurality of host computers.

47. The non-transitory computer readable storage medium of claim 46, wherein the computer system has an existing configuration, prior to performing said automatically provisioning, in which the computer system is zoned to provide access to the at least one of the logical volumes to a first subset of the plurality of host computers, and wherein said creating a transaction comprises creating a transaction that re-zones the computer system to provide access to the at least one of the logical volumes only to a second subset of the plurality of host computers that is different than the first subset.

48. The non-transitory computer readable storage medium of claim 33, wherein said selecting the at least one resource comprises:
  determining what resources are available for selection to satisfy the provisioning request by querying the at least one host computer, the at least one storage system and the at least one connectivity resource; and
  selecting the at least one resource from among the plurality of resources for each of the at least one host computer, the at least one storage system and the at least one connectivity resource in response to the act of determining.

49. The non-transitory computer readable storage medium of claim 33, wherein the computer system comprises at least one data set that comprises information relating to resources available from at least one of the at least one host computer, the at least one storage system and the at least one connectivity resource, and wherein said selecting the at least one resource comprises:
  determining what resources are available to satisfy the provisioning request by querying the data set; and
  selecting the at least one resource from among the plurality of resources for each of the at least one host computer, the at least one storage system and the at least one connectivity resource in response to the act of determining.

50. The non-transitory computer readable storage medium of claim 33, wherein the method further comprises undoing at least some of the series of actions performed when executing the transaction.

51. The non-transitory computer readable storage medium of claim 50, wherein said undoing at last some actions comprises:
  creating an undo transaction that comprises a series of undo actions that undo the series of actions created in said step of creating a transaction; and
  executing at least some of the series of undo actions.

52. The non-transitory computer readable storage medium of claim 32, wherein the method further comprises performing, prior to said reading and said automatically provisioning:
  assisting in creating the provisioning request.

53. The non-transitory computer readable storage medium of claim 52, wherein said assisting comprises:
  reverse engineering an existing computer system to create a specification of a configuration of the existing computer system.

54. The non-transitory computer readable storage medium of claim 53, wherein said reverse engineering is a computer-implemented act.

55. The non-transitory computer readable storage medium of claim 32, wherein the at least one connectivity resource comprises at least one network resource that forms at least part of a network interconnecting the at least one host computer and the at least one storage system, and wherein said automatically provisioning comprises automatically provisioning the at least one network resource.

56. The non-transitory computer readable storage medium of claim 32, wherein the at least one storage system presents a plurality of logical volumes of storage usable by at least one entity in the at least one host computer to store information, wherein the computer system has an existing configuration, prior to performing said automatically provisioning, in which at least some of the plurality of logical volumes presented by the at least one storage system are allocated to an entity in the at least one host computer, and wherein the method further comprises, prior to executing a transaction that allocates one of the plurality of logical volumes, determining that the one of the plurality of logical volumes is not already assigned to a different entity in the at least one host computer.

57. An apparatus, comprising:
  at least one processor programmed to automatically provision at least a portion of a computer system to meet a specification provided in a provisioning request, including automatically provisioning at least one resource from at least one host computer, at least one resource from at least one storage system, and at least one resource from at least one connectivity resource that connects the at least one host computer to the at least one storage system, wherein the provisioning request specifies a provisioning preference and the at least one processor is programmed to perform processing which attempts to implement the provisioning request satisfying the provisioning preference, and if unable to implement the provisioning request and satisfy the provisioning preference, the at least one processor is programmed to perform processing to implement the provisioning request without satisfying the provisioning preference, wherein the provisioning request includes physical requirements for one or more storage elements and requirements relating to a logical association of the one Or more storage elements, and wherein said automatically provisioning includes performing first processing, said first processing including:
  selecting a set of one or more resources:
  determining whether the set satisfies the physical requirements, wherein if it is determined that the set does not satisfy the physical requirements, the physical requirements are modified, another set of one or more resources is selected, and it is determined whether the another set satisfies the modified physical requirements; and
  wherein, after a first set of resources is determined that satisfies the physical requirements or a modified set of the physical requirements, it is determined whether the set also satisfies the requirements relating to a logical association, and wherein if it is determined that the first set does not satisfy the requirements relating to a logical association, any of the physical requirements and the requirements relating to a logical association are modified, and additional processing is performed to select resources satisfying the provisioning request.

58. The apparatus of claim 57, wherein each of the at least one host computer, the at least one storage system and the at least one connectivity resource comprises a plurality of resources, and wherein the at least one processor is programmed to:
  select the at least one resource from among the plurality of resources for each of the at least one host computer, the at least one storage system and the at least one connectivity resource to identify selected resources to satisfy the provisioning request;
  create a transaction that comprises a series of actions to configure the selected resources to satisfy the provisioning request; and
  execute the transaction to configure the selected resources in a manner that satisfies the provisioning request.

59. The apparatus of claim 58, wherein the at least one storage system presents logical volumes of storage usable by at least one entity in the at least one host computer to store information, the at least one entity including at least one of a file system, a logical volume manager and a database manager, and wherein the at least one processor is programmed to create a transaction that allocates at least one of the logical volumes to the at least one entity in the at least one host computer.

60. The apparatus of claim 58, wherein the at least one storage system presents logical volumes of storage usable by at least one entity in the at least one host computer to store information, and wherein the at least one processor is programmed to create a transaction that assigns at least one of the logical volumes to at least one port of the at least one host computer through which the at least one of the logical volumes will be accessible to the at least one entity.

61. The apparatus of claim 58, wherein the at least one processor is programmed to select at least one logical volume of storage, presented by the at least one storage system, to be used by the at least one host computer to store information to satisfy the provisioning request.

62. The apparatus of claim 61, wherein the at least one processor is programmed to create a transaction that configures the selected at least one logical volume to satisfy the provisioning request.

63. The apparatus of claim 62, wherein the at least one processor is programmed to create a transaction that configures the selected at least one logical volume to serve as a spare volume available for dynamic assignment.

64. The apparatus of claim 61, wherein the at least one processor is programmed to consider performance characteristics of the at least one logical volume in determining that the selected at least one logical volume can be used to satisfy the provisioning request.

65. The apparatus of claim 61, wherein the at least one processor is programmed to consider a storage capacity of the at least one logical volume in determining that the selected at least one logical volume can be used to satisfy the provisioning request.

66. The apparatus of claim 58, wherein the at least one storage system presents logical volumes of storage that can be used to store information, and wherein the at least one processor it programmed to create a transaction that maps at least one of the logical volumes to at least one port of the at least one storage system through which the at least one of the logical volumes will be accessible.

67. The apparatus of claim 66, wherein the at least one storage system has an existing configuration, prior to execution of the transaction, in which the at least one of the logical volumes is mapped to a first port of the at least one storage system, and wherein the at least one processor is programmed to create and execute a transaction that re-maps the at least one of the logical volumes to a second port of the at least one storage system that is different than the first port.

68. The apparatus of claim 58, wherein the at least one storage system presents logical volumes of storage that can be used to store information, and wherein the at least one processor is programmed to create a transaction that creates a mirrored relationship between at least two of the logical volumes.

69. The apparatus of claim 58, wherein the at least one storage system presents logical volumes of storage that can be used to store information, and wherein the at least one processor is programmed to create a transaction that configures a communication path through the at least one connectivity resource to make at least one of the logical volumes accessible to the at least one host computer to store information.

70. The apparatus of claim 69, wherein the at least one processor is programmed to create a transaction that configures at least two parallel communication paths through the at least one connectivity resource to make the at least one of the logical volumes accessible to the at least one host computer.

71. The apparatus of claim 58, wherein the at least one host computer comprises a plurality of host computers, wherein the at least one storage system presents logical volumes of storage usable by the plurality of host computers to store information, and wherein the at least one processor is programmed to create a transaction that zones the computer system to provide access to at least one of the logical volumes only to a subset of the plurality of host computers.

72. The apparatus of claim 71, wherein the computer system has an existing configuration, prior to execution of the transaction, in which the computer system is zoned to provide access to the at least one of the logical volumes to a first subset of the plurality of host computers, and wherein the at least one processor is programmed to create and execute a transaction that re-zones the computer system to provide access to the at least one of the logical volumes only to a second subset of the plurality of host computers that is different than the first subset.

73. The apparatus of claim 58, wherein the at least one processor is programmed to:
  determine what resources are available for selection to satisfy the provisioning request by querying the at least one host computer, the at least one storage system and the at least one connectivity resource; and
  select the at least one resource from among the plurality of resources determined to be available for each of the at least one host computer, the at least one storage system and the at least one connectivity resource.

74. The apparatus of claim 58, wherein the computer system comprises at least one data set that comprises information relating to resources available from at least one of the at least one host computer, the at least one storage system and the at least one connectivity resource, and wherein the at least one processor is programmed to:
  determine what resources are available to satisfy the provisioning request by querying the data set; and
  select the at least one resource from among the plurality of resources determined to be available for each of the at least one host computer, the at least one storage system and the at least one connectivity resource.

75. The apparatus of claim 58, wherein the at least one processor is programmed to undo at least some of the series of actions executed when the transaction is executed.

76. The apparatus of claim 75, wherein the at least one processor is programmed to create an undo transaction that comprises a series of undo actions that undo the series of actions in the transaction.

77. The apparatus of claim 57, wherein the processor is programmed to assist in creating the provisioning request.

78. The apparatus of claim 77, wherein the at least one processor is programmed to assist in creating the provisioning request by reverse engineering an existing computer system to create a specification of a configuration of the existing computer system, so that the specification of the existing computer system can be modified to create the specification provided in the provisioning request.

79. The apparatus of claim 57, wherein the at least one connectivity resource comprises at least one network resource that forms at least part of network interconnecting the at least one host computer and the at least one storage system, and wherein the at least one processor is programmed to automatically provision the at least one network resource.

80. The apparatus of claim 57, wherein the at least one storage system presents a plurality of logical volumes of storage usable by at least one entity in the at least one host computer to store information, wherein the computer system has an existing configuration, prior to execution of the transaction, in which at least some of the plurality of logical volumes presented by the at least one storage system are allocated to an entity in the at least one host computer, and wherein the at least one processor is programmed to, prior to executing a transaction that allocates one of the plurality of logical volumes, determine that the one of the plurality of logical volumes is not already assigned to a different entity in the at least one host computer.

81. The apparatus of claim 57, wherein the provisioning request specifies provisioning requirements in any of a plurality of levels of detail and wherein the apparatus further comprises a computer readable storage medium including code stored thereon to process each of said plurality of levels of detail.

82. A method of provisioning at least a portion of a computer system to meet a specification provided in a provisioning request, the method comprising:
   reading the provisioning request, the provisioning request defining the at least a portion of the computer system to comprise a unit of storage to be provided to at least one of a plurality of host computers, wherein the provisioning request includes physical requirements for one or more storage elements and requirements relating to a logical association of the one or more storage elements;
   automatically provisioning the at least a portion of the computer system in response to the provisioning request, including:
      selecting at least one logical volume of storage from at least one storage system that can serve as the unit of storage defined by the provisioning request;
      selecting at least one connectivity resource that can provide a communication path through which the selected at least one logical volume can be made accessible to the at least one of the plurality of host computers;
      creating a transaction that comprises a series of actions to configure the selected at least one logical volume and the selected at least one connectivity resource to satisfy the provisioning request, including configuring the selected at least one logical volume to satisfy the provisioning request, mapping the selected at least one logical volume to at least one port of the at least one storage system through which the selected at least one logical volume will be accessible, configuring the communication path, and configuring the at least a portion of the computer system to provide access to the selected at least one logical volume only to the at least one of the plurality of host computers; and
      executing the transaction to configure the selected at least one logical volume and the selected at least one connectivity resource in a manner that satisfies the provisioning request, and wherein the provisioning request specifies a provisioning preference and said automatically provisioning attempts to implement the provisioning request satisfying the provisioning preference, and if unable to implement the provisioning request and satisfy the provisioning preference, said automatically provisioning includes processing to implement the provisioning request without satisfying the provisioning preference, and
   wherein said automatically provisioning includes performing first processing, said first processing including:
      selecting a set of one or more resources;
      determining whether the set satisfies the physical requirements, wherein if it is determined that the set does not satisfy the physical requirements, the physical requirements are modified, another set of one or more resources is selected, and it is determined whether the another set satisfies the modified physical requirements; and
   wherein, after a first set of resources is determined that satisfies the physical requirements or a modified set of the physical requirements, it is determined whether the first set also satisfies the requirements relating to a logical association, and if it is determined that the first set does not satisfy the requirements relating to a logical association, any of the physical requirements and the requirements relating to a logical association are modified, and additional processing is performed to select resources satisfying the provisioning request.

83. The method of claim 82, wherein the provisioning request indicates a level of tolerance for automatically reconfiguring one or more volumes of storage having an existing storage configuration in order to satisfy the provisioning request.

84. The method of claim 83, wherein, if the provisioning request specifies a first level of tolerance indicating no tolerance for reconfiguration operations, said automatically provisioning is prevented from changing a current configuration of any existing volumes of storage in order to satisfy the provisioning request, and if the provisioning request specifies a second level of tolerance higher than the first level, said automatically provisioning is authorized to change a current configuration of one or more existing volumes of storage in order to satisfy the provisioning request.

85. A non-transitory computer readable storage medium encoded with a computer program that, when executed, performs a method of provisioning at least a portion of a computer system to meet a specification provided in a provisioning request, the method comprising:
   reading the provisioning request, the provisioning request defining the at least a portion of the computer system to comprise a unit of storage to be provided to at least one of a plurality of host computers, wherein the provisioning request includes physical requirements for one or more storage elements and requirements relating to a logical association of the one or more storage elements;
   automatically provisioning the at least a portion of the computer system in response to the provisioning request, including:
      selecting at least one logical volume of storage from at least one storage system that can serve as the unit of storage defined by the provisioning request;
      selecting at least one connectivity resource that can provide a communication path through which the selected at least one logical volume can be made accessible to the at least one of the plurality of host computers;
      creating a transaction that comprises a series of actions to configure the selected at least one logical volume and the selected at least one connectivity resource to satisfy the provisioning request, including configuring the selected at least one logical volume to satisfy the provisioning request, mapping the selected at least one logical volume to at least one port of the at least one storage system through which the selected at least one logical volume will be accessible, configuring the communication path, and configuring the at least a portion of the computer system to provide access to the selected at least one logical volume only to the at least one of the plurality of host computers; and
      executing the transaction to configure the selected at least one logical volume and the selected at least one connectivity resource in a manner that satisfies the provisioning request, and wherein the provisioning request specifies a provisioning preference and said automatically provisioning attempts to implement the provisioning request satisfying the provisioning preference, and if unable to implement the provisioning request and satisfy the provisioning preference, said automatically provisioning includes processing to implement the provisioning request without satisfying the provisioning preference, and wherein said automatically provisioning further includes performing first processing, said first processing including:
  selecting a set of one or more resources;
  determining whether the set satisfies the physical requirements, wherein if it is determined that the set does not satisfy the physical requirements, the physical requirements are modified, another set of one or more resources is selected, and it is determined whether the another set satisfies the modified physical requirements; and
  wherein, after a first set of resources is determined that satisfies the physical requirements or a modified set of the physical requirements, it is determined whether the first set also satisfies the requirements relating to a logical association, and if it is determined that the first set does not satisfy the requirements relating to a logical association, any of the physical requirements and the requirements relating to a logical association are modified, and additional processing is performed to select resources satisfying the provisioning request.

86. An apparatus, comprising:
at least one processor programmed to automatically provision at least a portion of a computer system to meet a specification provided in a provisioning request that defines the at least a portion of the computer system to comprise a unit of storage to be provided to at least one of a plurality of host computers, wherein the provisioning request includes physical requirements for one or more storage elements and requirements relating to a logical association of the one or more storage elements, the at least one processor being programmed to:
  select at least one logical volume of storage from at least one storage system that can serve as the unit of storage defined by the provisioning request;
  select at least one connectivity resource that can provide a communication path through which the selected at least one logical volume can be made accessible to the at least one of the plurality of host computers;
  create a transaction that comprises a series of actions to configure the selected at least one logical volume and the selected at least one connectivity resource to satisfy the provisioning request, including configuring the selected at least one logical volume to satisfy the provisioning request, mapping the selected at least one logical volume to at least one port of the at least one storage system through which the selected at least one logical volume will be accessible, configuring the communication path, and configuring the at least a portion of the computer system to provide access to the selected at least one logical volume only to the at least one of the plurality of host computers; and
  execute the transaction to configure the selected at least one logical volume and the selected at least one connectivity resource in a manner that satisfies the provisioning request, and wherein the provisioning request specifies a provisioning preference and the at least one processor is programmed to perform processing which attempts to implement the provisioning request satisfying the provisioning preference, and if unable to implement the provisioning request and satisfy the provisioning preference, the at least one processor is programmed to perform processing to implement the provisioning request without satisfying the provisioning preference, and
wherein the at least one processor is further programmed to perform first processing including:
  selecting a set of one or more resources;
  determining whether the set satisfies the physical requirements, wherein if it is determined that the set does not satisfy the physical requirements, the physical requirements are modified, another set of one or more resources is selected, and it is determined whether the another set satisfies the modified physical requirements; and
  wherein, after a first set of resources is determined that satisfies the physical requirements or a modified set of the physical requirements, it is determined whether the first set also satisfies the requirements relating to a logical association, and if it is determined that the first set does not satisfy the requirements relating to a logical association, any of the physical requirements and the requirements relating to a logical association are modified, and additional processing is performed to select resources satisfying the provisioning request.

* * * * *